US008045966B2

(12) United States Patent
Sakamoto

(10) Patent No.: US 8,045,966 B2
(45) Date of Patent: Oct. 25, 2011

(54) WIRELESS TERMINAL, BASE DEVICE, WIRELESS SYSTEM, WIRELESS TERMINAL CONTROL PROGRAM, BASE DEVICE CONTROL PROGRAM, AND COMPUTER-READABLE STORAGE MEDIUM

(75) Inventor: Kenji Sakamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 521 days.

(21) Appl. No.: 10/553,351

(22) PCT Filed: Apr. 13, 2004

(86) PCT No.: PCT/JP2004/005271
§ 371 (c)(1),
(2), (4) Date: Sep. 13, 2006

(87) PCT Pub. No.: WO2004/093389
PCT Pub. Date: Oct. 28, 2004

(65) Prior Publication Data
US 2007/0127408 A1    Jun. 7, 2007

(30) Foreign Application Priority Data

Apr. 17, 2003  (JP) .................................. 2003-112770
Apr. 8, 2004  (JP) .................................. 2004-114698

(51) Int. Cl.
*H04N 9/64*    (2006.01)
*H04N 5/50*    (2006.01)
*H04M 1/00*    (2006.01)

(52) U.S. Cl. ......... 455/414.3; 455/3.06; 725/38; 725/68

(58) Field of Classification Search ........................ None
See application file for complete search history.

(56) References Cited

U.S. PATENT DOCUMENTS

| 5,819,173 | A  | * | 10/1998 | Lawrence et al. ............. 455/515 |
| 6,418,129 | B1 | * | 7/2002 | Fingerhut ..................... 370/328 |
| 6,760,770 | B1 | * | 7/2004 | Kageyama .................... 709/229 |
| 6,871,065 | B2 | * | 3/2005 | Yamaguchi ................. 455/414.1 |
| 6,920,479 | B2 | * | 7/2005 | McDowall et al. ........... 709/203 |
| 7,139,014 | B1 | * | 11/2006 | Kim et al. .................. 348/14.01 |
| 7,248,859 | B2 | * | 7/2007 | Yamaguchi ................ 455/414.1 |
| 7,313,375 | B2 | * | 12/2007 | Lee et al. .................... 455/186.1 |
| 7,403,510 | B1 |   | 7/2008 | Miyake |
| 2002/0016776 | A1 |  | 2/2002 | Chu et al. |
| 2002/0018057 | A1 |  | 2/2002 | Sano |
| 2002/0020743 | A1 |  | 2/2002 | Sugukawa et al. |

(Continued)

FOREIGN PATENT DOCUMENTS

CN    1335720 A    2/2002

(Continued)

*Primary Examiner* — Rafael Pérez-Guitérrez
*Assistant Examiner* — Frank Donado
(74) *Attorney, Agent, or Firm* — Birch, Stewart, Kolasch & Birch, LLP

(57) ABSTRACT

The present invention is a method for establishing and identifying a communication pair in a wireless AV system and provides a system in which notification is provided to a user in a case where a wrong pair that the user does not intend to establish among plural AV devices is established.

A wireless AV system is a wireless system comprising one or more transmission-side devices and one or more reception-side devices, each of the one or more transmission-side devices comprises means for issuing its own ID with respect to the one or more reception-side devices, the one or more reception-side devices comprising means for storing the ID received from a transmission-side device.

11 Claims, 11 Drawing Sheets

U.S. PATENT DOCUMENTS

| | | | |
|---|---|---|---|
| 2002/0062467 A1* | 5/2002 | Hunzinger | 714/749 |
| 2003/0022674 A1* | 1/2003 | Shintai et al. | 455/456 |
| 2003/0186707 A1* | 10/2003 | Pihl et al. | 455/456.1 |
| 2003/0232593 A1* | 12/2003 | Wahlroos et al. | 455/3.05 |
| 2004/0063428 A1* | 4/2004 | Jansson | 455/434 |
| 2004/0082344 A1* | 4/2004 | Moilanen et al. | 455/456.3 |
| 2004/0227692 A1* | 11/2004 | Yoon | 345/3.1 |
| 2005/0059350 A1 | 3/2005 | Sano | |
| 2007/0286144 A1 | 12/2007 | Miyake | |

FOREIGN PATENT DOCUMENTS

| | | |
|---|---|---|
| EP | 0 961 193 A2 | 12/1999 |
| EP | 1 045 532 A1 | 10/2000 |
| EP | 1182833 A1 | 2/2002 |
| GB | 2 377 574 A | 1/2003 |
| JP | 4-77817 A | 3/1992 |
| JP | 5-235845 A | 9/1993 |
| JP | 07-046662 A | 2/1995 |
| JP | 2001-144767 A | 5/2001 |
| JP | 2002-51051 A | 2/2002 |
| JP | 2002-63652 A | 2/2002 |
| JP | 2002-150339 A | 5/2002 |
| JP | 2002-215483 A | 8/2002 |
| WO | WO-01/80547 A2 | 10/2001 |

\* cited by examiner

WIRELESS TERMINAL, BASE DEVICE, WIRELESS SYSTEM, WIRELESS TERMINAL CONTROL PROGRAM, BASE DEVICE CONTROL PROGRAM, AND COMPUTER-READABLE STORAGE MEDIUM

TECHNICAL FIELD

The present invention relates to a wireless terminal, base device, wireless system, wireless terminal control program, base device control program, and computer-readable storage medium.

BACKGROUND ART

In recent years, an increase in a number of cases, in which LANs (Local Area Network) are constructed in offices, ordinary homes, and the like, has been accompanying drastic pervasion of Internet. A need for constructing a LAN wirelessly, a so-called wireless LAN is remarkably uprising with help from progress in digital wireless communication technique, because wiring is troublesome. Moreover, a large number of pervaded wireless LANs in use is expected in the future because such wireless LANS can be used for a mobile terminal including a laptop under a mobile environment. IEEE 802.11 that has already been standardized by IEEE (Institute of Electrical and Electronics Engineers) is a typical technique of this wireless LAN. This standardized technique defines a physical layer to a MAC (Media Access Control) layer, which is a lower layer of a data link layer, in an OSI (Open Systems Interconnection) model. This standardized technique can replace that of the Ethernet®, which is a wired transmission channel of a LAN. Furthermore, the technique has a specification capable of providing a roaming function as an additional function realized by being wireless.

At present, preparation of a new terrestrial digital broadcast, which will take over a terrestrial analog broadcast watched all over. Japan, is proceeding. This terrestrial digital broadcast started in three big Japanese metropolitan areas, Kanto, Kinki, and Tokai areas in 2003. The terrestrial digital broadcast is planned to be extended all over Japan in 2006. This movement is accompanied by a plan to abolish the present analog broadcast in 2011.

ISDB (Integrated Services Digital Broadcasting) is a concept of next-generation integrated digital broadcasting, which treats all information such as a video image, sound, and data as digital data. Digital television broadcasting, digital sound broadcasting, facsimile broadcasting, and multi-media broadcasting are studied as a specific service of the ISDB. Utilization of a satellite broadcast wave, a terrestrial broadcast wave and wired transmission channels such as a coaxial cable and an optical fiber is examined as a transmission channel for the ISDB.

The technical standard ISDB-T (Terrestrial) of this terrestrial digital broadcast employs OFDM (Orthogonal Frequency Division Multiplexing) using many carrier waves (carrier) in a modulation system. Accordingly, ghost disturbance caused by plural propagation channels (multi pass) such as reflection caused by a building can be prevented. Moreover, the ISDB-T has plural specifications for each of a transmission mode defining intervals of carriers, a modulation system of each carrier, and a guard interval provided for every effective symbol period in a time-axis direction. In the standard, a considerable number of signal formats are admitted. In practice, the most appropriate format is selected among these specifications, according to services such as fixed receiving and mobile receiving.

Moreover, in the ISDB-T, one transmission channel (communication channel) (frequency band of substantially 5.6 MHz) is divided into 13 segments (1 segment=substantially 430 kHz). Modulation systems are changed per segment. This allows a broadcast station to arbitrarily decide a signal structure so as to carry out, for example, (i) sound broadcast and high definition broadcast, or (ii) standard fixed broadcast and mobile broadcast, by one transmission channel.

Furthermore, the ISDB-T adopts an interleave in a time-axis direction and an electric wave utilized is appropriate for transmission to a moving object. Accordingly, one distinct feature of the ISDB-T is that the ISDB-T allows consistent receiving even by a mobile terminal, for example, a mobile receiver such as an in-vehicle TV, a PDA (Personal Digital Assistants), a cellular phone, and the like. A service supposing such mobile receiving is greatly expected in the future.

In a wireless AV (Audio-Visual) system constructed upon the technique mentioned above, means for causing devices in the system to recognize each other, which devices perform wireless communication, is necessary.

For example, as illustrated in FIG. 8, the wireless AV system is constructed by (i) wireless centers (transmitters) 122a through 122c and (ii) a receiver which wirelessly receives a content stream from one of wireless centers (transmitters) 122a through 122c and reproduces the content stream. In such a wireless AV system, a receiver side needs to identify a wireless center out of the wireless centers (transmitters) 122a through 122c with which a communication pair with the receiver is established. Various methods are proposed for a method for establishing a communication pair between wireless communication devices and a method for identifying the communication pair.

For example, Patent Document 1 cited below discloses a system in a digital cordless telephone device. In the system, (i) a main phone or a handset is allowed to wirelessly transmit to another main phone or another handset a code for calling up a system provided mutually in the main phone and the handset and (ii) the another main phone and the another handset stores in a memory this received code. This system makes it possible to easily set plural main phones and handsets to be operable in the same wireless systems.

Moreover, Patent Document 2 cited below discloses a device control system. The system includes a device being subjected to a control and a controller for controlling the device via a transmission channel. The device includes (i) device state management means for managing a state of a main body of the device, and (ii) setback notification means for notifying information concerning the state of the main body of the device in a case where the state of the main body of the device changes. The controller includes state information receiving means for receiving information concerning the state from the device. This allows the controller, in a case where the state of the device changes, to promptly comprehend the state of the device after a change in the state in the device control system constructed by a device being subjected to the control and the controller for controlling the device.

(Patent Document 1)
Japanese Unexamined Patent Publication 46662/1995. (Tokukaihei 7-46662) (published on Feb. 14, 1995)
(Patent Document 2)
Japanese Unexamined Patent Publication 215483/2002 (published on Aug. 2, 2002)

However, the wireless AV system as illustrated in FIG. 8 is used in order to wirelessly connect plural AV devices in a general household. Accordingly, plural AV devices are provided relatively close to each other. As a result, in this case, interference may occur in such an exchange of control data as mentioned above.

For example, in FIG. 8, a user tries to receive a stream from a wireless center 122a by a receiver 133 and carry out an operation so as to reproduce the stream. In this case, a connection processing, in which the wireless center 122a transmits an ID of the wireless center 122a to the receiver 133 and the receiver 133 identifies this ID, is performed. Then, a wireless communication pair between these devices is established.

However, at the same time as the connection processing mentioned above, a similar connection processing may be performed at the wireless center 122b closely positioned. In this case, the receiver 133 may mistakenly receive an ID of the wireless center 122b, which ID is transmitted from the wireless center 122b to another receiver. To explain more specifically, in a case where the receiver 133 receivers and identifies the ID from the wireless center 122b ahead of the ID from the wireless center 122a, the receiver 133 establishes a connection to the wireless center 122b but does not connect to the wireless center 122a.

In this case, the receiver 133 reproduces a stream from the wireless center 122b with which the receiver has mistakenly established a communication pair. However, the user is not notified that the wrong communication pair is established because the operation of the receiver 133 is normal.

The present invention is attained in view of such a case. Accordingly, the purpose of the present invention is to provide a wireless terminal, a base device, a wireless system, a wireless terminal control method, a base device control method, a wireless terminal control program, a base device control program, and a computer-readable storage medium, which can notify a user an establishment of a wrong connection in a case where a wrong wireless connection for the user is established.

DISCLOSURE OF INVENTION

In order to achieve the object above, in order to attain the object mentioned above, according to the present invention, a wireless terminal for establishing connection with a base device, includes: connection establishing means for establishing the connection with the base device by obtaining identification data that specifies the base device; and connection counterpart notifying means for notifying, based on the identification data, a user of the base device to which the wireless terminal is currently connected.

According to the above arrangement, the wireless terminal obtains the identification data from the base device and establishes the connection with the base device. Moreover, the wireless terminal notifies, based on the identification data, a user of the base device to which the wireless terminal is currently connected. Accordingly, the user can specify the base device that is a connection counterpart and the user can know whether the wireless terminal is connected with the base device that the user requests for.

In order to achiever the object mentioned above, a base device of the present invention includes: identification data transmission means for transmitting the identification data to the wireless terminal.

This allows the user to be notified of a base device, to which the wireless terminal is connected, from the wireless terminal. Accordingly, the user can know whether the wireless terminal is connected with the base device that the user requests for.

In order to achieve the above object, a wireless system of the present invention includes: the wireless terminal; and a base device including identification data transmission means for transmitting the identification data to the wireless terminal.

This allows the user to be notified of a base device, to which the wireless terminal is connected, from the wireless terminal. Accordingly, the user can know whether the wireless terminal is connected with the base device that the user requests for.

In order to achieve the above object, according to the present invention, in a wireless system including a base device and a wireless terminal, the wireless terminal includes: connection establishing means for establishing the connection with the base device by obtaining identification data that specifies the base device; first connection confirming mode transiting means for causing transition into a connection confirmation mode in accordance with input of an instruction from a user; connection confirming means for obtaining, after the transition to the connection confirmation mode, a connection confirmation command from the base device to which the wireless terminal is connected, the connection confirmation command being for confirming the connection; and warning means for warning the user if the connection confirmation means does not obtain the connection confirmation command within a predetermined time after the transition to the connection confirmation mode, and the base device includes: identification data transmission means for transmitting the identification data that identifies the base device; second connection confirming mode transiting means for causing transition into the connection confirmation mode in accordance with the input of the instruction from the user; and connection confirmation command transmitting means for transmitting the connection confirmation command, if the transition into the connection confirmation is performed.

According to the above arrangement, by obtaining the identification data transmitted from the base device, the wireless terminal can establish the connection with this base device. However, in a case where the wireless terminal has not obtained this identification data for some reason, the connection between the wireless terminal and the base device is not established.

According to the above arrangement, when the wireless device and the base device is moved into a connection confirmation mode in accordance with input of an instruction from a user, the base device that has moved to the connection confirmation mode is arranged to transmit the above connection confirmation command. In case where the wireless terminal is connected to this base device that has moved into the connection confirmation mode, the wireless terminal can obtain the above connection confirmation command. However, in case where the wireless terminal is not connected to this base device that has moved into the connection confirmation mode, the wireless terminal cannot obtain the above connection confirmation command.

Accordingly, in an arrangement in which warning is given to a user in a case where the wireless terminal, after the transition to the connection confirmation mode, does not obtain the above connection confirmation command from the base device that has moved into the connection confirmation mode within a predetermined time, the user who has received the warning can confirm that the base device that has moved into the connection confirmation mode is not connected to the wireless terminal.

If the user causes the base device that the user requests for and the wireless terminal to move into a connection confirmation mode, the user can easily know whether the wireless terminal is connected with the base device that the user requests for.

A wireless terminal of the present invention constitutes the wireless system and can attain the same effect as the wireless system as mentioned above. Further, a base device constitutes the wireless system and can attain the same effect as the wireless system as mentioned above.

The wireless terminal or the base device may be realized by a computer. In such a case, a computer readable storage medium which stores a control program for realizing the wireless terminal or the base device with a computer by causing the computer to function as each of the means mentioned above, is also included in the scope of the present invention.

Additional objects, features, and strengths of the present invention will be made clear by the description below. Further, the advantages of the present invention will be evident from the following explanation in reference to the drawings.

BEST MODE FOR CARRYING OUT THE INVENTION

One embodiment of the present invention is explained in details as follows with reference to drawings attached.

Figure 1:
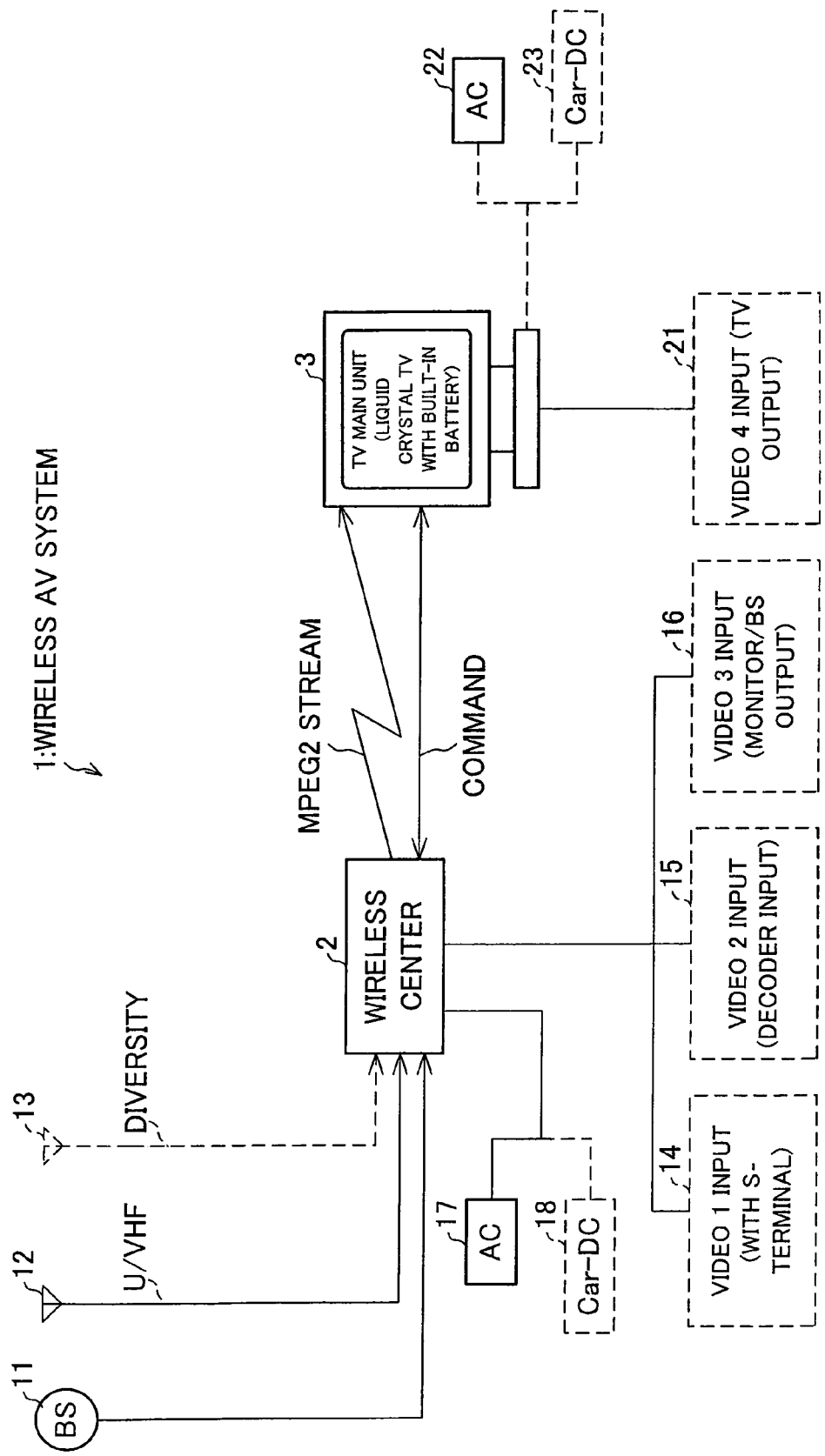
FIG. 1 is a block diagram of a structure of a wireless AV system according to an embodiment of the present invention.
Figure 11:
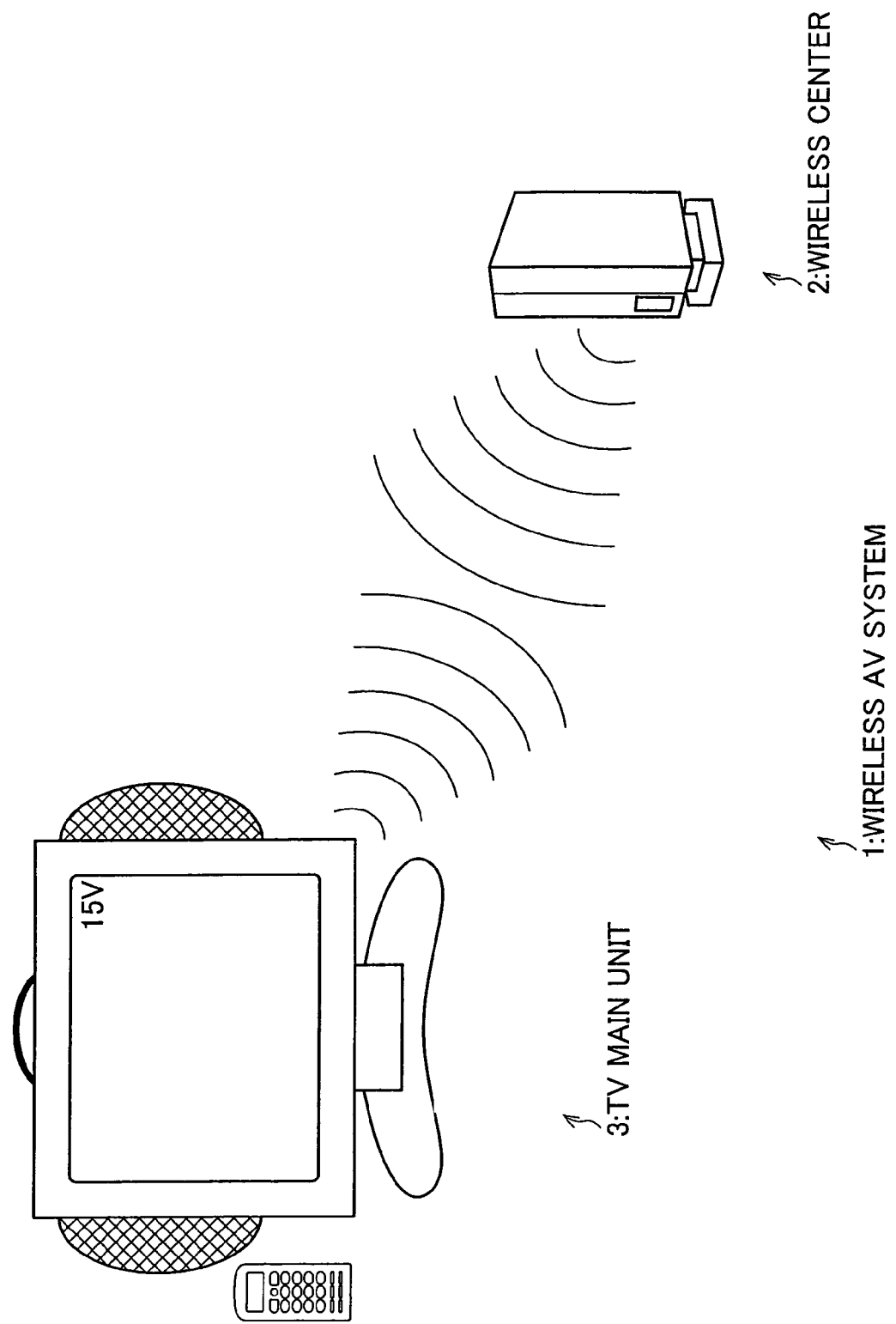
FIG. 11 is an explanatory diagram schematically illustrating the wireless AV system as illustrated in FIG. 1.

FIG. 1 is a block diagram of a structure of a wireless AV system (wireless system) 1 according to this embodiment of the present invention. This example is a case in which the present invention is applied to a wireless TV receiver as the wireless AV system 1 of this embodiment, the wireless TV receiver being separable from a display. FIG. 11 is an explanatory diagram schematically illustrating the wireless AV system 1 that serves as a wireless TV receiver separable from a display.

As illustrated in FIG. 1 and FIG. 11, the wireless AV system 1 includes a wireless center unit (hereinafter, called wireless center) as a base device and a main body 3 (hereinafter, called TV main unit) of a television (TV) unit as a portable terminal (wireless terminal). The wireless center 2 (a wireless communication device, a center device) and the TV main unit 3 (a wireless communication device, a display device) as a pair constructs a wireless transmission network.

As illustrated in FIG. 11, the TV main unit 3 is wireless and a battery is built in the TV main unit 3. The TV main unit 3 has a remote controller, by which an operation of a video player and the like is possible. The wireless center 2 is connected to an antenna such as a BS antenna, a U/V (UHF/VHF) antenna or the like, an AV device such as a DVD (Digital Versatile Disk) player or a video player, or the like. A video image and/or sound data is transmitted wirelessly from the wireless center 2 to the TV main unit 3.

As illustrated in FIG. 1, the wireless center 2 includes antenna terminals (a BS terminal 11, a U/VHF antenna terminal 12, a diversity terminal 13), a video 1 input terminal (with an S terminal) 14, a video 2 input terminal (decoder input) 15, a video 3 input terminal (output for both a monitor and BS (Broadcasting Satellite)) 16, an AC (Alternate Current) source section 17, and a Car-DC (Direct Current) source section 18. The terminals 14, 15, and 16 are for connecting thereto devices such as a digital VTR (Video Tape Recorder) and a DVD player.

The TV main unit 3 includes a video 4 input terminal (which is also used for TV output) 21 for connecting thereto a digital VTR, a DVD (Digital Versatile Disc) player or the like, an AC source section 22, and a Car-DC source section 23.

Because the TV main unit 3 can be separated from the wireless center 2 and has a built-in battery, the TV main unit 3, which is a thin-model display, is mobile or portable. A concept of the TV main unit 3 is broad and includes, for example, various kinds of display devices such as a liquid crystal television (hereinafter called liquid crystal TV), an inorganic EL (Electro Luminescence)/organic EL display, a plasma display, and the like. The TV main unit is not limited to a kind of a display system. Moreover, the TV main unit 3 includes, in the main, a display function, a sonic function, and the like. On the other hand, the wireless center 2 includes a control function for controlling a tuner section and the TV main unit 3 mainly, and the like. The TV main unit 3 of this embodiment is explained as the thin-model display device by taking a liquid crystal TV as an example.

Data (video image and/or sound data) is transmitted/received between the wireless center 2 and the TV main unit 3 by an SS (Spread Spectrum) wireless system, which complies with IEEE 802.11 standard. Recently, 5 GHz band became available as a frequency band. 5 GHz band, instead of 2.4 GHz band, may be used in the embodiment. The data transmission from the wireless center 2 to the TV main unit 3 uses a video compression format of MPEG (Moving Picture Expert Group). In the data transmission, data of a motion image, DVD-Video, or digital broadcasting is transmitted via a communication line at over 10 Mbps. Moreover, a command transmission (transmission of a control command) between the wireless center 2 and the TV main unit 3 is carried out by the SS wireless system.

In actual application, streams (bit string), in which an MPEG video and an MPEG audio are encoded, and other encoded streams may be contained. In such a case, integration of encoded streams by multiplexing as well as synchronization is necessary and it is necessary for the stream to adapt a data format suitable to a physical format or a protocol specific to an accumulative media, a network and the like.

An MPEG2 system includes MPEG2-PS (Program Stream) that constructs one program in the same manner as MPEG1 and MPEG2-TS (Transport Stream) that can construct plural programs.

Many of MPEG streams are streams that contain one bit flag, but MPEG streams are a byte stream that contains units such as a header and the like which are byte-aligned, unit by unit. In data structures common to all MPEG systems, information on data length is placed ahead of data in a data section which does not have a fixed length. When unnecessary, the data section is skipped or beginning of a next data constellation is confirmed. Accordingly, the data structure makes it possible to carry out an isolation processing of high reliability.

In a device for receiving a compressed video image and a compressed sound signal in conformity with an encoding system of MPEG2, a audio-visual sampling frequency on an encoding side need be matched with a audio-visual sampling frequency or an STC (System Time Clock) on a decoding side, in order to prevent overflow and/or underflow of the video and sound data on the decoding side.

Therefore, a PCR (Program Clock Reference) or a SCR (System Clock Reference) defined by a MPEG2 system standard (ISO/IEC standard 13818-1) is adopted in a decoding device in order to match the audio-visual sampling frequency on the encoding side with the audio-visual sampling frequency on the decoding side.

Figure 2:
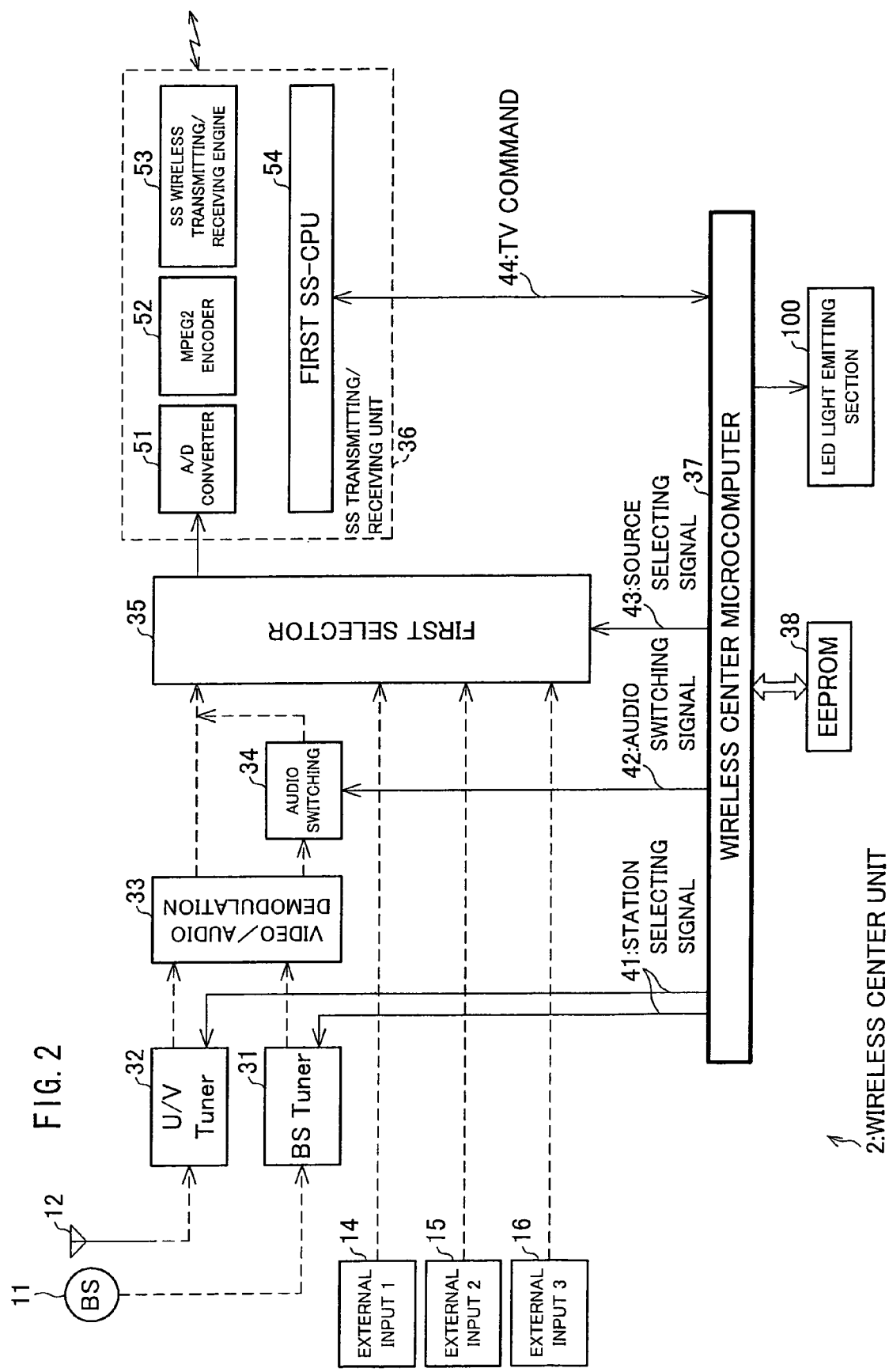
FIG. 2 is a block diagram of a wireless center in the wireless AV system as illustrated in FIG. 1.

FIG. 2 is a block diagram of a structure of the wireless center 2 of the wireless AV system 1.

In FIG. 2, the wireless center 2 includes a BS tuner 31, a U/UHF tuner 32, a video/audio demodulation section 33, a audio switching section 34, a first selector 35, an SS transmitting/receiving unit 36 (communication means), a wireless center microcomputer 37, an EEPROM (Electrically Erasable Programmable ROM (Read Only Memory)) 38 and LED (Light Emitting Diode) light emitting section 100. The BS tuner 31 is connected to the BS terminal 11. The BS tuner 31 receives BS broadcasting and selects a station according to a signal for selecting a channel. The U/VHF tuner 32 is connected to the U/VHF antenna terminal 12. The U/VHF tuner 32 receives U/VHF broadcasting and selects a station according a signal for selecting a channel. A video/audio demodulation section 33 demodulates the audio/visual (AV) signal received/selected by the BS tuner 31 or the U/VHF tuner 32. An audio switching section 34 switches sound received by an audio switching signal and information concerning programs, for example, an EPG (Electrical Program Guide) and the like. The first selector 35 is for selecting, according to a source selecting signal, audio-visual information, content information, and external input information from the video 1 input terminal (external input 1) 14, the video 2 input terminal (decoder input) (external input 2) 15, and the video 3 input terminal (monitor/BS output) (external input signal 3) 16. The SS transmitting/receiving unit 36 transmits and receives a TV command signal 44. The SS transmitting/receiving unit 36 converts data selected by the first selector 35 into the MPEG2 video compression format and transmits the converted data to the TV main unit 3 according to SS wireless system. The wireless center microcomputer 37 transmits a station selecting signal 41, a audio switching signal 42, a source selecting signal 43 and the like. The wireless center microcomputer 37 transmits/receives the TV command signal 44 in order to control an entire device. The EEPROM 38 is an electrically rewritable nonvolatile memory that stores various kinds of data such as a control program of the wireless center microcomputer 37, communication control data, and, further, a program for changing transmission channel. The LED light emitting section 100, made of an LED light emitting device and the like on a surface of the wireless center 2, carries out a predetermined emission of light.

The wireless center 2 includes plural tuners (here, two tuners) for receiving broadcasting. At least one out of the two tuners, which are the BS tuner 31 and the U/VHF tuner 32 may be a tuner which can receive terrestrial digital broadcasting.

The SS transmitting/receiving unit 36 controls each section of (i) an A/D converting section 51 for converting the data selected by the first selector 35 into a digital signal, (ii) an MPEG2 encoder 52 for converting the data into the MPEG2 video compression format, (iii) an SS wireless transmitting/receiving engine 53 made of an SS wireless device and a wireless control section for transmitting the transmission data by the SS wireless system, and (iv) an SS transmitting/receiving unit 36. The SS transmitting/receiving unit 36 also includes a first SS-CPU (Central Processing Unit) 54 for finding a state of an electric wave.

The SS wireless transmitting/receiving engine 53 includes a transmitting function for transmitting an MPEG2 stream, command, and the like to an SS transmitting/receiving unit 61 (later explained with reference to FIG. 3) of the TV main unit 3 and a transmitting/receiving function for transmitting/receiving a command and the like to/from the SS transmitting/receiving unit 61.

Various kinds of specifications in the wireless center 2 and the TV main unit 3 can be changed by changing a program to be written into the EEPROM 38. Namely, recently, constructing a program ROM with a nonvolatile memory such as an EPROM and EEPROM in order to avoid time loss for changing a mask ROM for each debug in a system development, for the purposes of drastically reducing time for developing and correcting a program. Moreover, upgrading a function and changing a function becomes easy in a structure in which content of a program in the EEPROM is rewritten by downloading a program.

Figure 3:
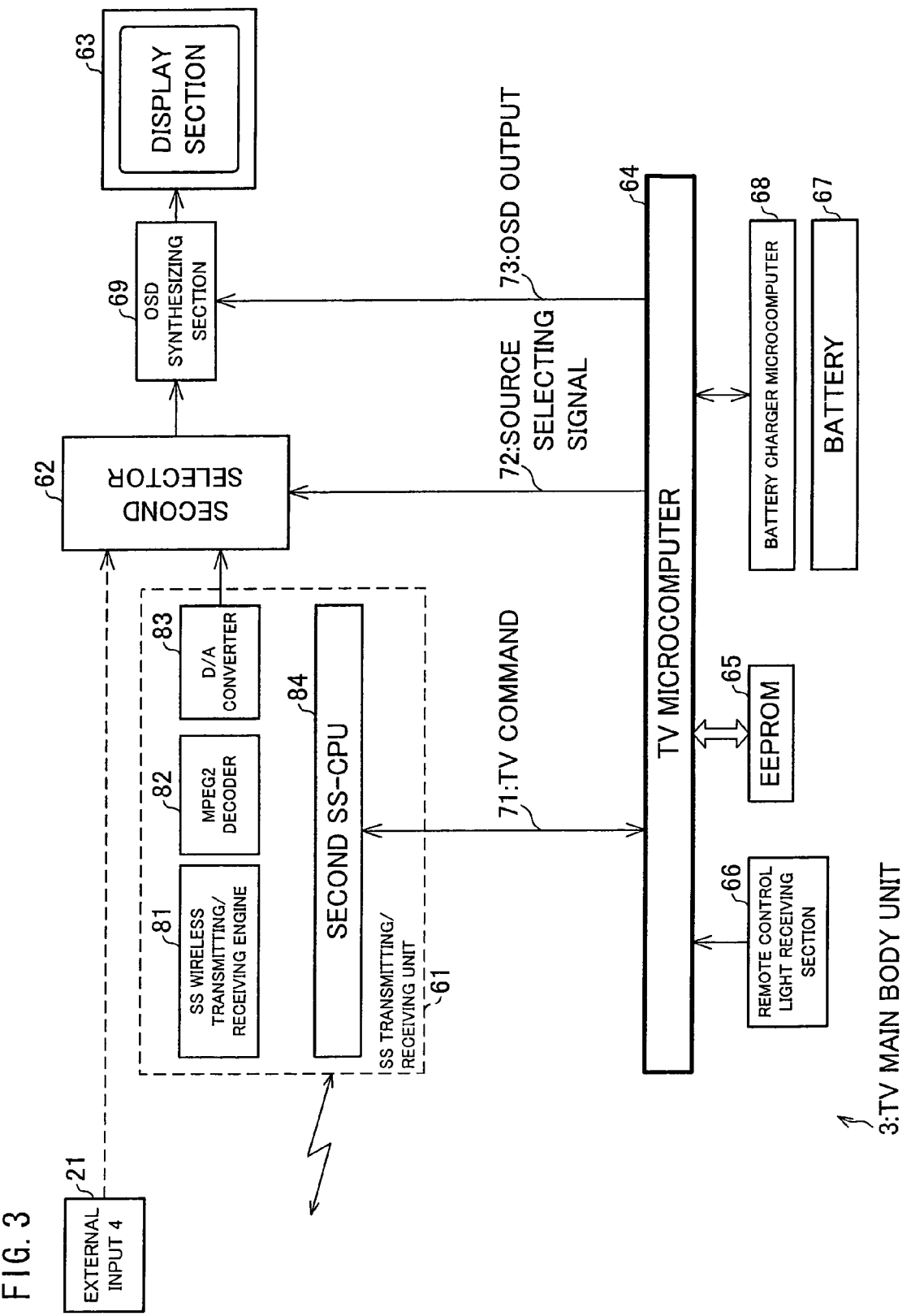
FIG. 3 is a block diagram of a structure of a TV (Television) main body in the wireless AV system as illustrated in FIG. 1.

FIG. 3 is a block diagram of a structure of the TV main unit 3 of the wireless AV system 1 mentioned above.

In FIG. 3, the TV main unit 3 includes the SS transmitting/receiving unit 61 (communication means), a second selector 62, a display section 63 (a part of notification means), a TV microcomputer 64 (a part of notification means), an EEPROM 65, a remote control light receiving section 66, a battery 67, and a battery charge microcomputer 68. The SS transmitting/receiving unit 61 transmits/receives a TV command signal 71. The SS transmitting/receiving unit 61 receives a MPEG2 stream and command transmission data transmitted from the SS transmitting/receiving unit 36 of the wireless center 2. The SS transmitting/receiving unit 61 decodes (reconstructs) the received MPEG2 stream and the like to original data. The second selector 62 selects the data decoded by the SS transmitting/receiving unit 61 and an AV signal inputted via the video 4 input terminal (TV output) 21 from outside. The display section 63 is made of an LCD (Liquid Crystal Display) displaying a video signal and outputting a sound signal and the like. The TV microcomputer 64 controls the entire device by transmitting a source selecting signal 72, an OSD (On Screen Display) 73 and the like, as well as transmitting/receiving the TV command signal 71. The EEPROM 65 is a electrically rewritable nonvolatile memory for storing various kinds of data such as a control program of the TV microcomputer 64, communication control data, and further a program for changing a transmission channel. The light receiving section 66 of a remote controller receives light, which is a control command, from a remote controller device (hereinafter, a remote controller device), which is not illustrated. The battery charge microcomputer 68 controls charge/discharge of the battery 67.

The SS transmitting/receiving unit 61 includes a SS wireless transmitting/receiving engine 81, an MPEG2 decoder 82, a D/A converting section 83, and a second SS-CPU 84 (means for finding a state of communication). The SS wireless transmitting/receiving engine 81 is made of an SS wireless station device and a wireless control section for receiving data transmitted by the SS wireless system. The MPEG2 decoder 82 decodes the MPEG2 stream received. The D/A converting section 83 converts the thus decoded data to an analog signal. The second SS-CPU 84 finds a state of an electric wave as well as controlling each section of the SS transmitting/receiving unit 61.

The SS wireless transmitting/receiving engine 81 includes a receiving function for receiving the MPEG2 stream, a command and the like from the SS transmitting/receiving unit 36 of the wireless center 2 and a transmitting function for transmitting a command and the like from the SS transmitting/receiving unit 61.

Especially, the second SS-CPU 84 has a function as means for finding a state of an electric wave, the means finding, based on an electric field intensity and an error rate, a communication state (strength of an electric wave and interference in a communication channel) between the wireless center 2 and the TV main unit 3 according to a request for retransmission. Information of the state of the electric wave found is sent to the TV microcomputer 64 as the TV command signal 71. In this embodiment, an arrangement in which the second SS-CPU 84 of the TV main unit 3 includes the function for detecting the state of the electric wave mentioned above. However, the present invention may have an arrangement in which the first SS-CPU 54 of the wireless center 2 includes such function and transmits the information of the state of the electric wave found as a command to the TV main unit 3 from the wireless center 2. Alternately, both of the first SS-CPU 54 and the second SS-CPU 84 may include the function for finding the state of the electric wave. Furthermore, an arrangement in which the TV microcomputer 64 or the wireless center microcomputer 37 includes the function for detecting the state of the electric wave, as mentioned above, is possible.

The TV microcomputer 64 includes a function as notification means as well as controlling an entire device. The notification means notifies messages on reception sensitivity information, such as (i) disruption of video image and sound data, (ii) changing a transmission channel is being performed, (iii) establishing connection is being performed, and (iv) being out of the communication range.

Figure 4:
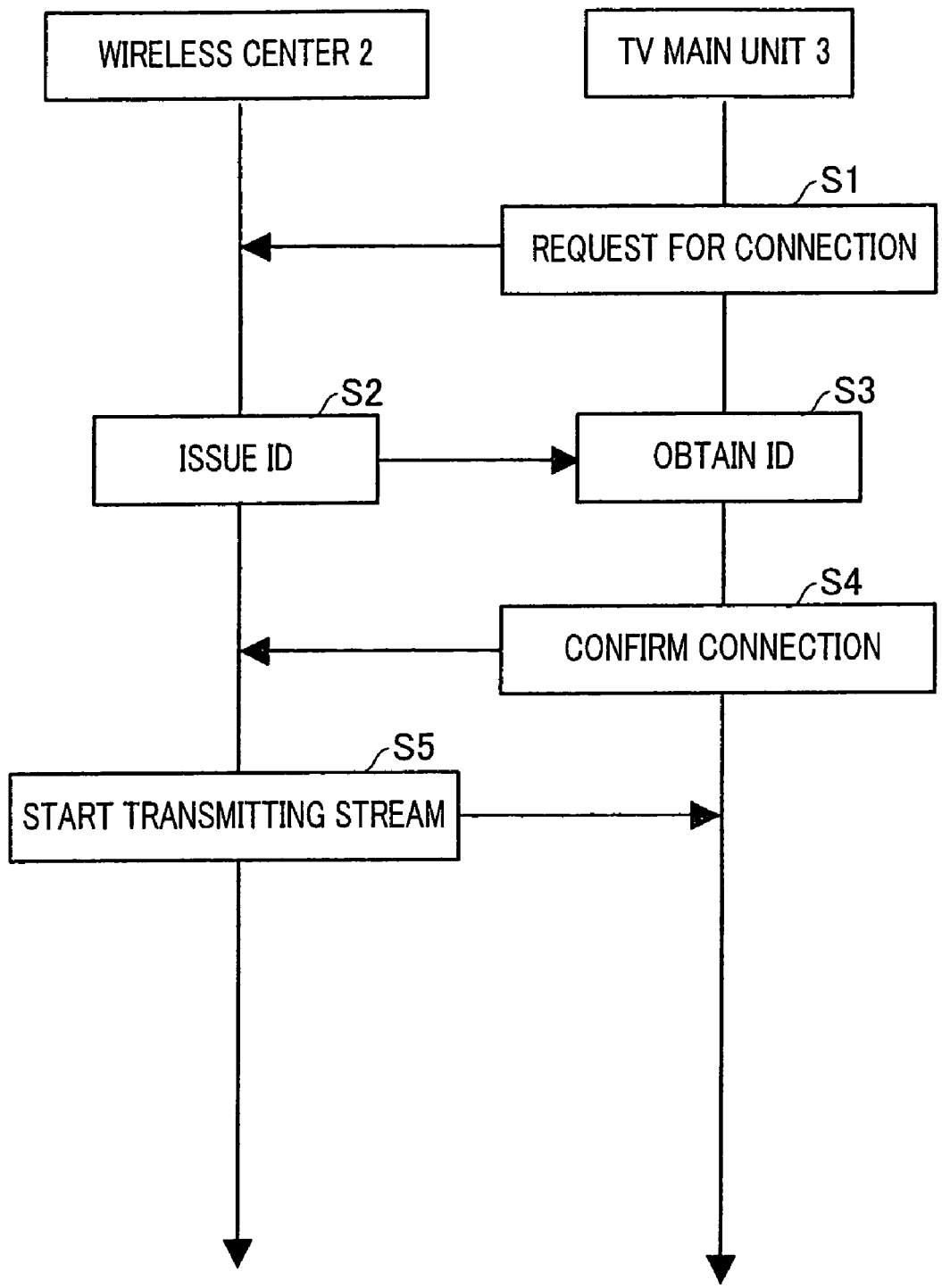
FIG. 4 is a flow chart illustrating an operation for normally establishing a communication pair between the wireless center and the TV main unit in the wireless AV system as illustrated in FIG. 1.

Moreover, the TV microcomputer 64 measures time period during which the communication is disrupted, and carries out such a transmission channel changing control which maintains a transmission channel for a predetermined time from time at witch the communication is disrupted. Specific examples of the transmission channel changing control are explained later with reference to FIG. 4 through FIG. 9. The TV microcomputer includes an OSD causing function section inside and displays information such as a channel of a program, time, and volume on a screen of a TV and the like. In a video image player such as a TV and an electronics device such as a TV meeting system, information on the channel of a program, time volume is generally displayed on a screen of a display. The data of the OSD is held not as an image but as a format called bitmap. The data is converted into a pixel value expressed by Y, Cb, and Cr in a YUV system from the bitmap. The pixels converted are superpositioned on an original image of broadcasting and the like. If an image reproducing device such as a DVD, which is not illustrated, and the like is connected to the video 4 input terminal (TV output), OSD display becomes possible by superpositioning the pixel on an reproduced image on a display screen. The image superposition processing to superposition the pixel on the original image such as TV broadcast and the like so as to perform the OSD display is carried out by an OSD synthesizing section 69 (FIG. 4).

Moreover, although illustration is omitted, the TV main unit 3 may be constructed by a speaker, a key input section, a slot for inserting/pulling out of a card-type external extended storage medium and may be arranged to directly read data from a card-type external extended storage medium attached in the slot. The card-type external extended storage medium may be, for example, (i) an SRAM (Static RAM (Random Access Memory)) card maintaining written information by backup of an electric source, or a medium made of a flash memory which does not need backup of the electric source and the like, for example, (ii) a Compact Flash® (CF) (iii) Smart Media, (iv) memory stick, (v) micromini hard disk drive (HDD) which has a similar size as the Compact Flash or which can be applied to a PC card Type II, and the like.

The remote controller light receiving section 66 is a port section using IR (Infrared Rays). The remote controller light receiving section 66 optically receives an optical signal from a remote controller device that carries out various kinds of operations to the TV main unit 3 or the wireless center 2. To be more specific, the remote controller light receiving section 66 is an I/O port which carries out optical communication in conformity with a standard for transmitting data by an infrared ray, for example IrDA (Infrared Data Association), ASK or the like, or a wireless communication port for carrying out communication by an electric wave.

The battery 67 supplies predetermined power to each section of the TV main unit 3. The battery charge microcomputer, when the battery 67 becomes able to be charged, controls charge/discharge with respect to the charge medium of the battery 67 (not illustrated) via a power supply terminal (not illustrated) by finding that, for example, the TV main unit 3 is attached to the wireless center 2, or to another cradle or the like. Specifically, the battery charge microcomputer 68 multiplies current discharged from a battery pack. When the battery charge microcomputer 68, as a result of the multiplication, determines that the capacity remaining in the battery pack is equal to or less than a predetermined value, the battery charge microcomputer 68 starts charging. On the other hand, when the battery charge microcomputer 68, as a result of the multiplication during charging, determines that the battery pack is fully charged, the battery charge microcomputer 68 stops charging. The charged battery 67 becomes a main electric source of a mobile TV and supplies power to each section of the main body, when the TV main unit 3 is separated from commercial electric source.

Next, a method for establishing a communication pair between the wireless center 2 and the TV main unit 3 in the wireless AV system 1 of this embodiment including the structure mentioned above is explained in details.

FIG. 4 is a flow chart illustrating an operation for normally establishing a communication pair between the wireless center 2 and the TV main unit 3 in the wireless AV system 1 of this embodiment.

In FIG. 4, first, the TV main unit 3 transmits a request for connection, according to user's operation via a remote controller and the like (S1), so that the TV main unit 3 will receive a stream from the wireless center 2. The transmission of the request for connection is performed by wirelessly transmitting a command from the SS transmitting/receiving unit 16, the command being generated by the TV microcomputer 64 of the TV main unit 3. The command transmitted includes the information identifying the wireless center 2 which is a destination of the transmission. This identification information may use what is stored beforehand in the EEPROM 65 of the TV main unit.

The wireless center microcomputer 37 of the wireless center 2, which microcomputer 37 has received the request for connection from the TV main unit 3 by the SS transmitting/receiving unit 36, generates ID issue command including ID indicating the wireless center microcomputer 37, which ID is stored in the EEPROM 38 or the like. (S2)

The TV main unit 3 that has received the ID issue command store, in the EEPROM 65 or the like, the obtained ID of the wireless center 2 as an ID of a counterpart device of the communication pair. (S3)

The TV main unit 3 transmits a connection confirmation command to the wireless center 2. (S4)

The wireless center 2 that has received the connection confirmation command from the TV main unit 3 transmits a predetermined stream via a predetermined transmission channel. (S5). As a result, the TV main unit 3 becomes capable of receiving and reproducing this stream.

Figure 7:
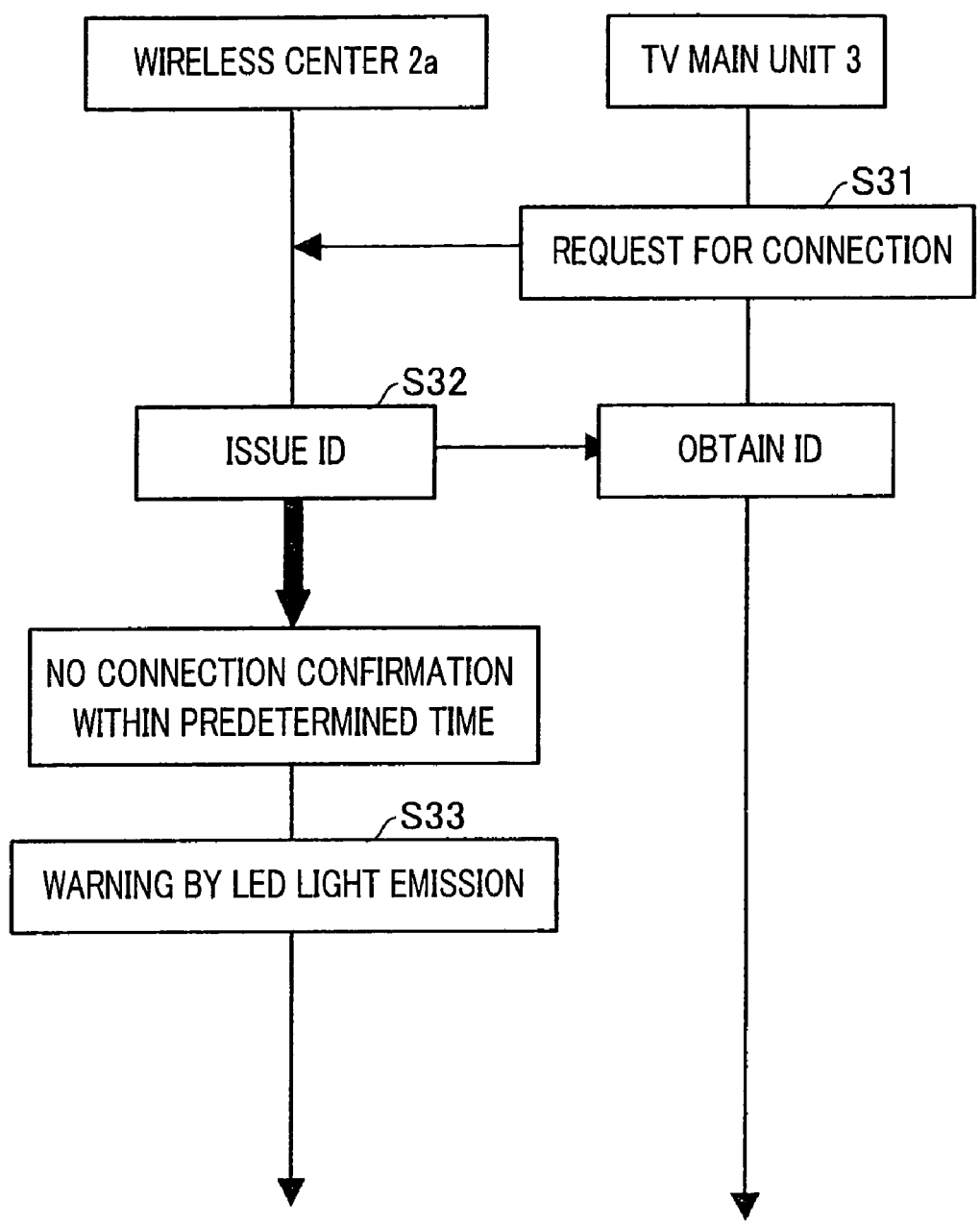
FIG. 7 is a flow chart illustrating a third configuration of an operation in a case where the TV main unit (receiver) side has mistakenly identified a counterpart of the communication pair because there are plural wireless centers near the TV main unit.
Figure 8:
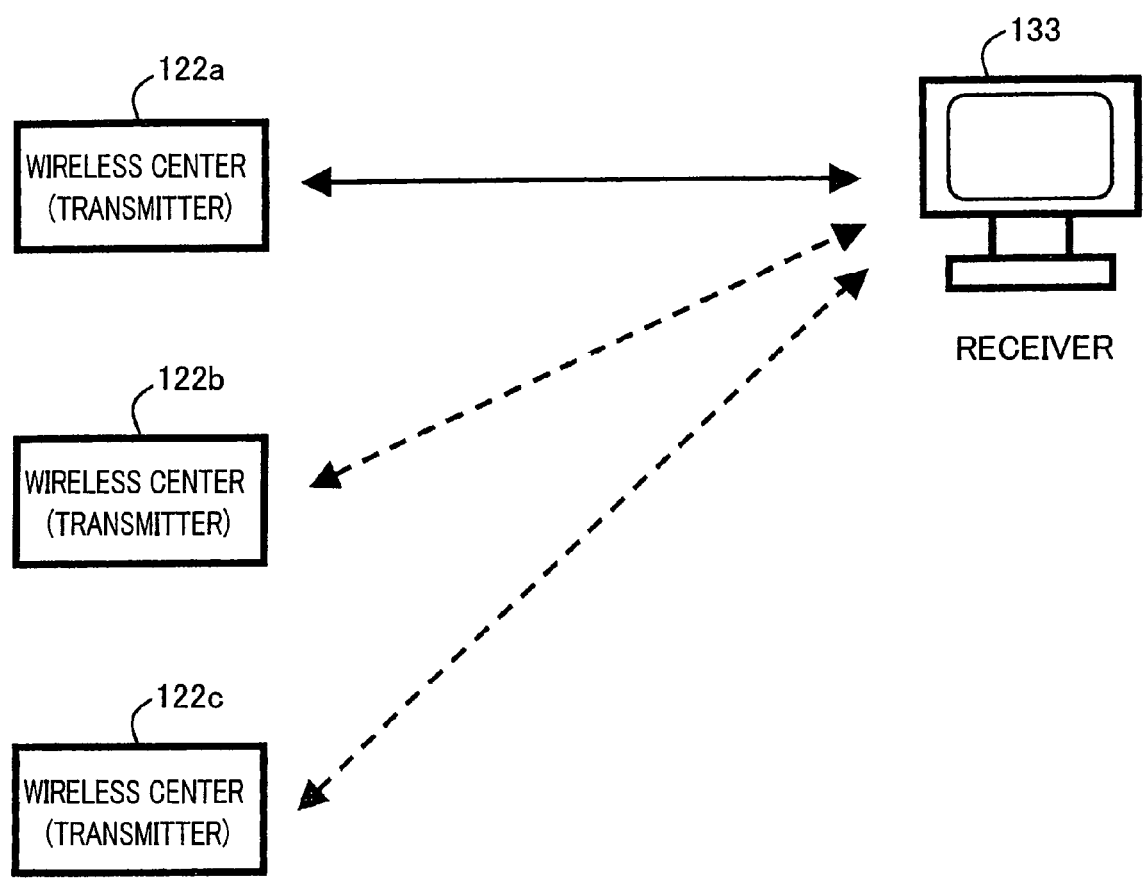
FIG. 8 illustrates an example of an arrangement of a wireless AV system including plural wireless centers (transmitters) and one receiver.

Next, as illustrated in FIG. 8, an operation, in a case where the TV main unit (receiver) 133 has mistakenly recognized an improper counter part as a communication pair because plural wireless centers exist, is explained with reference to FIGS. 5 through 7. Wireless centers 2a and 2b in FIGS. 5 through 7 has the same structure as the wireless center 2 mentioned above.

Figure 5:
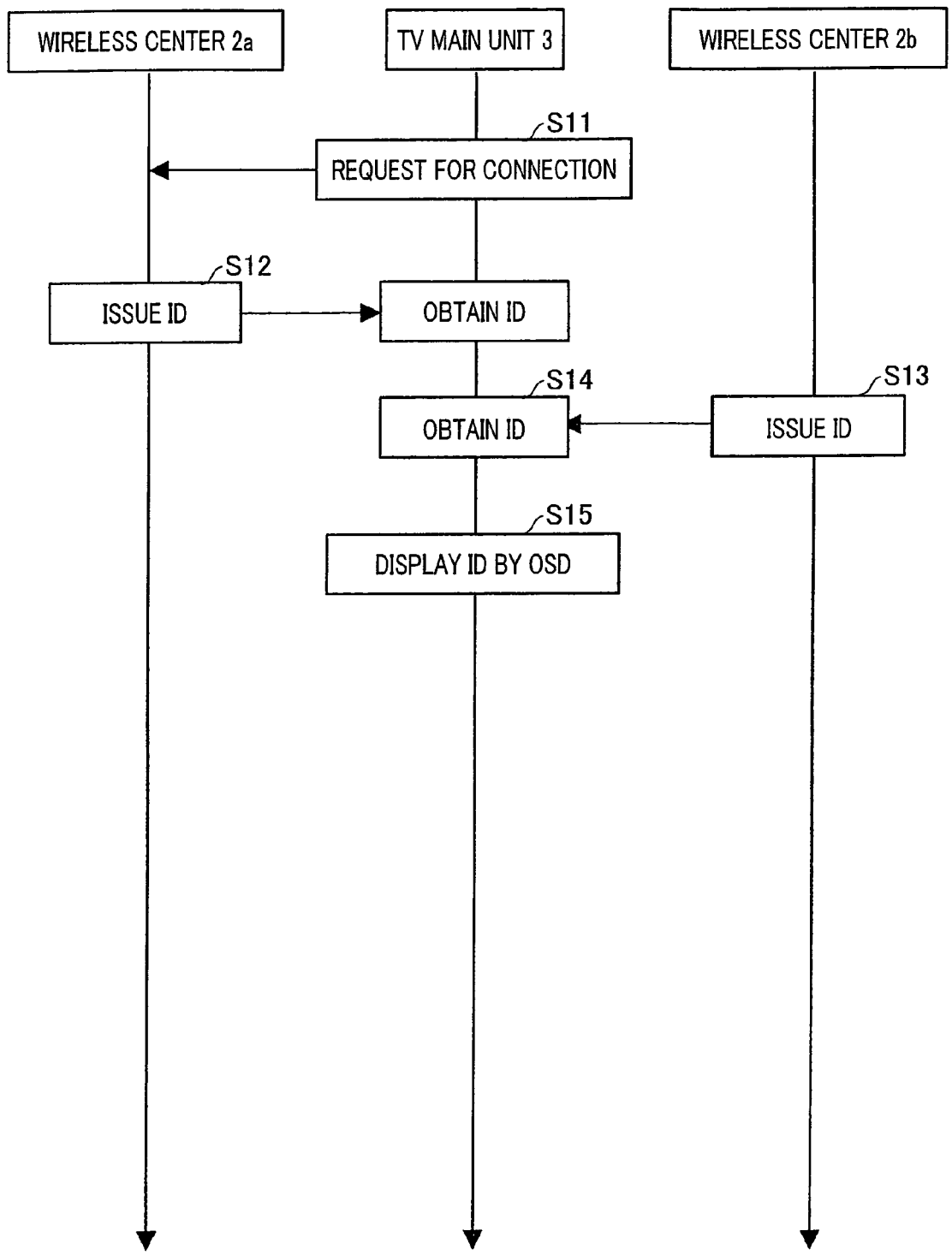
FIG. 5 is a flow chart illustrating a first configuration of an operation, in a case where the TV main unit (receiver) side has mistakenly identified a counterpart of the communication pair because there are plural wireless centers near the TV main unit.

FIG. 5 illustrates a first configuration of such operation. The TV main unit 3 transmits a request for connection to the wireless center 2a in order to establish a communication pair with the wireless center 2a (S11). The wireless center 2a having received this request transmits, to the TV main body 3, an IC issue command including an ID of the wireless center 2a (S12). The operation up to this is same as the operation of an example as illustrated in FIG. 4.

In a case where the TV main unit 3 receives an ID issue command transmitted by another wireless center 2b here (S13 and S14), the TV main unit 3 recognizes the ID of the wireless center 2b as a counterpart device of a communication pair and stores the ID.

Subsequent to this, the TV main unit 3 performs an OSD display in which the identification information of the present communication counterpart device is displayed on the display section 63 (S15). Then, the user can acknowledge that a wrong communication pair is established because the identification information of the wireless center 2b with which a connection should not be established is displayed.

In this embodiment, in a method to display the identification information, the ID (identification data) issued by the communication counterpart device as it is may be displayed as the identification information of the present communication counterpart device. It is more preferable to (i) receive, along with the ID, a device type of a communication counter device or a name of the device given for the device by the user beforehand and (ii) display the ID and the device type/user-given name together.

Figure 6:
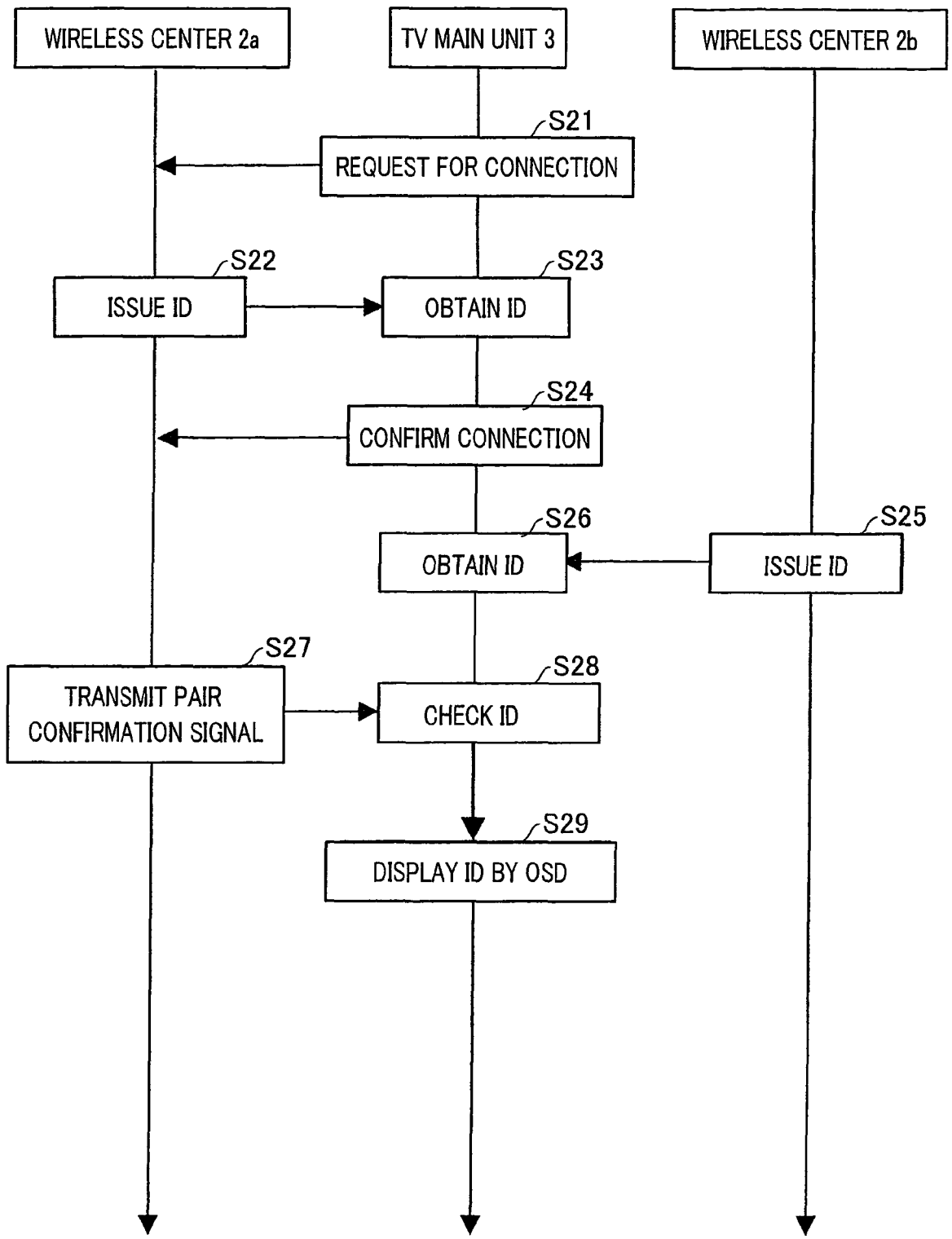
FIG. 6 is a flow chart illustrating a second configuration of an operation, in a case where the TV main unit (receiver) side has mistakenly identified a counterpart of the communication pair because there are plural wireless centers near the TV main unit.

FIG. 6 illustrates a second configuration of the operation. The TV main unit 3 transmits a request for connection to the wireless center 2a in order to establish a communication pair with the wireless center 2a (S21). The wireless center 2a having received this request transmits, to the TV main unit, an ID issue command including the ID of the wireless center 2a (S22). The TV main unit 3 having received the ID issue command stores the obtained ID of the wireless canter 2a (S23). At the same time, the TV main unit 3 transmits the connection confirmation command to the wireless center (S24). The operation up to this is same as the operation of the example illustrated in FIG. 4.

In a case where the TV main unit 3 receives the ID issue command transmitted by another wireless center 2b (S25), the TV main unit 3 recognizes the ID of the wireless center 2b as a counterpart device of a communication pair and stores the ID (S26).

However, in this embodiment, the wireless center 2a receiving the connection confirmation command from the TV main unit 3 is arranged to transmit a pair confirmation signal for confirming that an established communication pair is maintained at predetermined time intervals (S27). In the pair confirmation signal transmitted by the wireless center 2, the ID of the wireless center 2a is included.

The TV main unit 3 having received the pair confirmation signal from the wireless center 2a obtains the counterpart device ID included in the pair confirmation signal and compares the counter part device ID with the ID stored as an ID of the counterpart of the present communication pair (S28). In this embodiment, because the ID received from the another wireless center 2b is stored, the ID stored does not comply with the ID of the pair confirmation signal. Therefore, the establishment of the wrong communication pair is acknowledged.

The TV main unit 3 notifies a user of the establishment of the wrong communication pair by the OSD display on the display section 63 (S29). At this time, it is preferable to urge the user to perform an operation for reconnecting by displaying the ID (or the device type, or the name that the user predetermined) of the wireless center 2a with which a connection is supposed to be established and the ID (or the device type, or the name that the user predetermined) of the wireless center 2b with which a communication pair is mistakenly established are on an OSD display concurrently.

FIG. 7 illustrates a third configuration. The TV main unit 3 transmits a request for connection to the wireless center 2a in order to establish a communication pair with the wireless center 2a (S31). The wireless center 2a having received this request transmits, to the TV main body 3, an ID issue command including the ID of the wireless center 2a (S32). The operation up to this is same as the operation of the example illustrated in FIG. 4.

The following discusses a case where, after that, the TV main unit 3 has not transmitted a connection confirmation command to the wireless center 2a due to an establishment of a wrong communication pair with another wireless center or failure in operation.

In a case where the wireless center 2a does not receive a connection confirmation command within a predetermined time from transmission of an ID issue command to the TV main unit 3, the wireless center 2a causes an LED light emitting section 100 provided on a surface of the wireless center 2a to emit light in a predetermined method. Notification that a communication pair has not established normally can be made to the user (S33).

Apart from the light emission by the LED light emitting section 100, there may be various methods as a method for providing warning on the wireless center A side. For example, the method may be arranged by a predetermined method so as to emit a sound.

Figure 9:
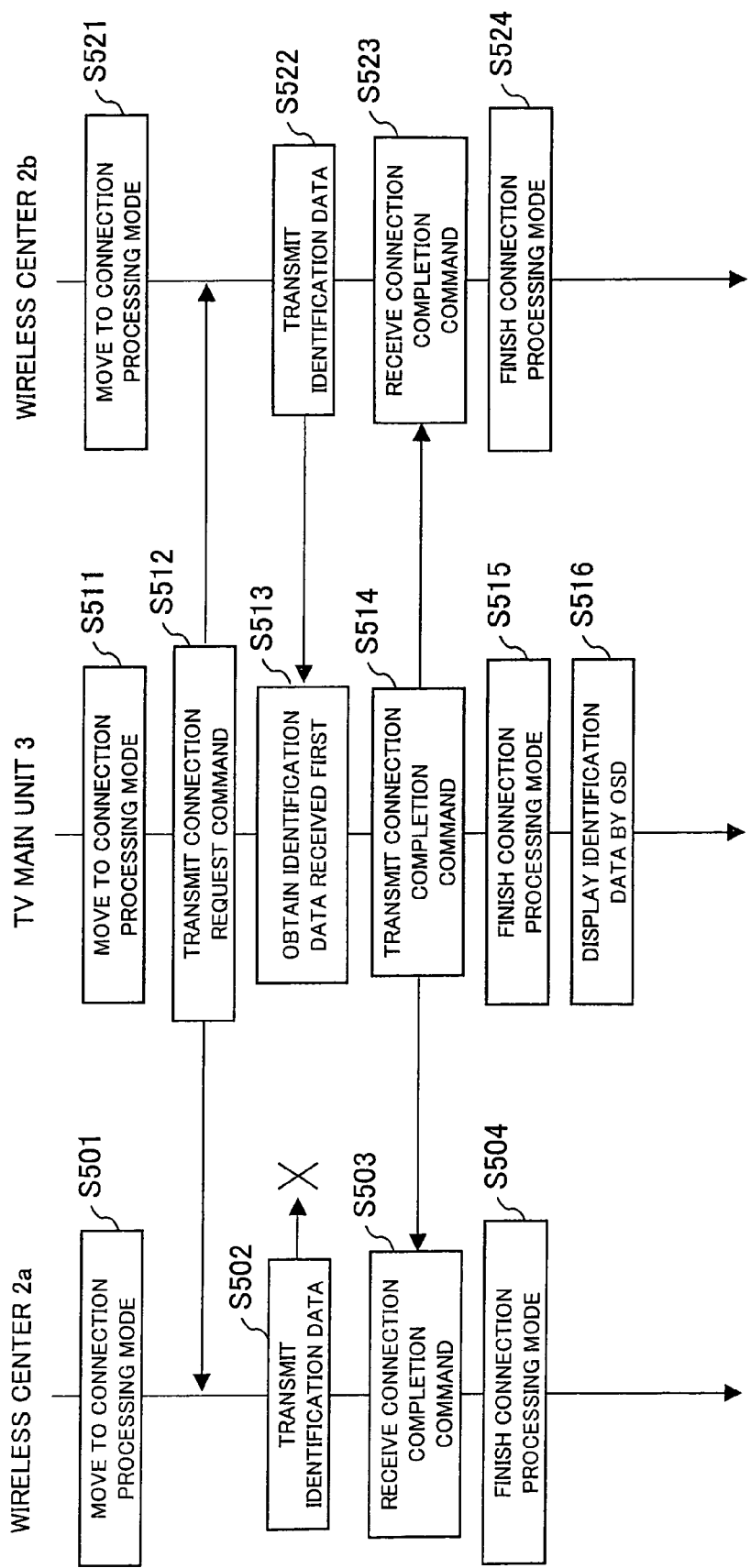
FIG. 9 is a flow chart of a case where a connection, which is unintended by a user, between the wireless center and the TV main unit is established, the flow chart illustrating a fourth configuration of a connection processing between the wireless center and the main body of the TV.

Furthermore, with reference to FIG. 9, the fourth configuration is explained. In the wireless centers 2*a* and 2*b*, each process in FIG. 9 is executed by the wireless center microcomputer (identification data transmission means) 37. In the TV main unit 3, the each process in FIG. 9 is executed by the TV microcomputer 64 (connection establishment means, connection destination notification means, connection request means, connection completion notification means, and image output means). The first SS-CPU 54 may execute the processing in the wireless center 2*a* and 2*b*, and the second SS-CPU 84 may execute the processing in the TV main unit 3.

The description below discusses a case where the wireless center 2*b* and the TV main unit 3 are wirelessly connected first although the user is trying to establish a wireless connection between the wireless center 2*a* and the TV main unit 3 in order to transmit data stream from the wireless center 2*a* to the TV main unit 3.

First, in order to establish the wireless connection between the TV main unit 3 and the wireless center 2*a*, the TV main unit 3 and the wireless center 2*a* are moved to a connection processing mode (S501 and S511). To be more specific, the user pushes a switch (not illustrated) for moving to a connection processing mode, the switch being provided in the TV main unit 3 and the wireless center 2*a*. Then, the TV main unit 3 and the wireless center 2*a* transit to the connection processing mode. Moreover, it is assumed that at this time the wireless center 2*b* positioned close to the TV main unit 3 is accidentally moved to a connection mode by an operation of another user (S521).

Here, the TV main unit 3 and the wireless centers 2*a* and 2*b* includes a common key for transmitting/receiving a command and data in the connection processing mode (each step other than S516 in FIG. 9). To be more specific, this common key, which is a common algorithm among the TV main unit 3, and the wireless centers 2*a* and 2*b*, is a key for carrying out encoding/decoding of a command and data transmitted/received during the connection mode.

To explain more specifically, when the TV main unit 3 transits to the connection processing mode, the TV main unit 3 reads a common key stored in the EEPROM 65 and encrypt/decrypt a command and data transmitted/received by this common key. Moreover, when transiting into the connection process mode, the wireless centers 2*a* and 2*b* reads out the common key stored in EEPROM 38, and performs the encryption/decryption of the command and data to be transmitted/received. This makes it possible for the TV main unit 3, and wireless centers 2*a* and 2*b* moved in the connection processing mode to encrypt a command and data transmitted/received among the TV main unit 3, and the wireless centers 2*a* and 2*b*.

When the TV main unit 3 transits to the connection processing mode, the TV main unit 3 transmits a connection request command for requesting a wireless connection to the wireless center 2 by broadcasting (S512).

Because the connection request command mentioned above is transmitted by broadcasting, not only the wireless center 2*a* but also the wireless center 2*b* transits to the connection mode can receive and decrypt this connection request command.

When the wireless center 2*a* receives the connection request command mentioned above, the wireless center 2*a* reads identification data for specifying the wireless center 2*a* from the EEPROM 38 and transmits this identification data by broadcasting (S502).

Moreover, when the wireless center 2*b* receives the connection request command, the wireless center 2*b* reads identification data for specifying the wireless center 2*b* from the EEPROM 38 and transmits this identification data by broadcasting (S522).

The identification data held or transmitted by the wireless centers 2*a* and 2*b* includes not only an ID (identification data) for specifying each wireless center, but also an identification key (key) for decrypt a encrypted data, command and the like as well as encoding data and command. This identification key is an algorithm particular to the wireless centers 2*a* and 2*b*.

The TV main unit 3 selects and obtains only an identification data received first among identification data transmitted by the wireless center 2*a* and 2*b*. Then the TV main unit 3 stores the obtained identification data into the EEPROM 65 (S513). Here, the TV main unit 3 is supposed to obtain the identification data from the wireless center 2*b*. Accordingly, the TV main unit 3 does not obtain the identification data form the wireless center 2*a*.

Furthermore, the TV main unit 3 transmits a connection processing completion command which indicates an establishment of a wireless connection by broadcasting (S514). When the TV main unit 3 transmits this connection processing completion command, the TV main unit 3 releases the connection processing mode (S515).

When the wireless center 2*a* and 2*b* receives the connection processing completion command mentioned above (S510 and S511), the wireless centers 2*a* and 2*b* acknowledges an establishment of connection and releases the connection processing mode (S504 and S524).

The TV main unit 3 after the release of the connection processing mode starts to encrypt/decrypt the data and a command by the identification key included in the identification data obtained at S513. Moreover, after the completion of the connection processing mode, the wireless center 2*b* does not use the common key. Instead the wireless center 2*b* transmits data encrypted by the identification key included in the identification data of the wireless center 2*b* by broadcasting. Namely, the TV main unit 3 can decrypt only the data transmitted from the wireless center 2*b* indicated by the identification data obtained at S513.

In other words, the TV main unit 3 obtains the identification data received first after the transmission of the connection request command at S513 and establishes a wireless connection with the wireless center 2*b* indicated by the obtained identification data.

Moreover, because the identification key included in the identification data transmitted from the wireless center 2*b* is an algorithm particular to the wireless center 2*b*, a unique wireless connection between the wireless center 2*b* and the TV main unit 3 are established. After the establishment of the wireless connection, the wireless center transmits data stream. The TV main unit 3 receives the data stream and outputs a video image and sound.

On the other hand, at S502 the wireless center 2*a* transmits the identification data in response to the connection request command mentioned above. At the same time, the wireless center 2*a* receives the connection processing completion command at S503. Therefore, the wireless center 2*a* operates in assumption that the wireless connection has been successfully established between the wireless center 2*a* and the TV main unit 3. Accordingly, after the connection processing mode is completed, the wireless center 2a transmits data stream encrypted by the identification key included in the identification data of the wireless center 2a. However, because the TV main unit 3 has not obtained the identification data of the wireless center 2a, the TV main unit 3 cannot decrypt this data stream. Namely, the TV main unit 3 and the wireless center 2a are not wirelessly connected. Accordingly, although the user tried to establish the wireless connection between the TV main unit 3 and the wireless center 2a, a wireless connection between the TV main unit 3 and the wireless center 2b is established.

In this embodiment, after the wireless connection is established, the TV main unit 3 causes the display section 63 to perform the OSD display of the identification data of the wireless center 2b with which the present wireless connection is established (S516). This acknowledges the user that the wireless center 2a is not connected to the TV main unit 3 as well as that the TV main unit 3 is wirelessly connected to the wireless center 2b.

Namely, the user can specify a wireless center to which the TV main unit 3 is wirelessly connected by visually checking the OSD display. Therefore, in a case where an unintended wireless connection is established, the user can acknowledge this at once and can retry the connection processing right away.

As mentioned above, according to the configuration as illustrated in FIG. 9, the TV main unit 3 obtains the identification data mentioned above from the wireless center 2 and establishes the connection to the wireless center 2 indicated by the identification obtained. Further, the TV main unit 3, based on this identification data, notifies the user the wireless center 2 to which the TV main unit 3 is presently connected. This allows the user to identify the wireless center 2 to which the TV main unit 3 is presently connected, and can acknowledge whether or not the TV main unit 3 is connected to an intended wireless center 2.

Next, a fifth configuration is described with reference to FIG. 10. The wireless center microcomputer (identification transmitting means, means for moving to a second connection confirmation mode, a connection confirmation command transmitting means) 37 executes each processing in FIG. 10. The TV microcomputer (connection establishing means, means for moving to a first connection confirmation mode, a connection confirmation means, warning means, connection request means, connection completion notifying means, image output means) 64 executes the each processing in the TV main unit 3 in FIG. 10. However, each processing in the wireless centers 2a and 2b may be executed by the first SS-CPU 54 and each processing in the TV main unit 3 may be executed by the second SS-CPU 84.

Figure 10:
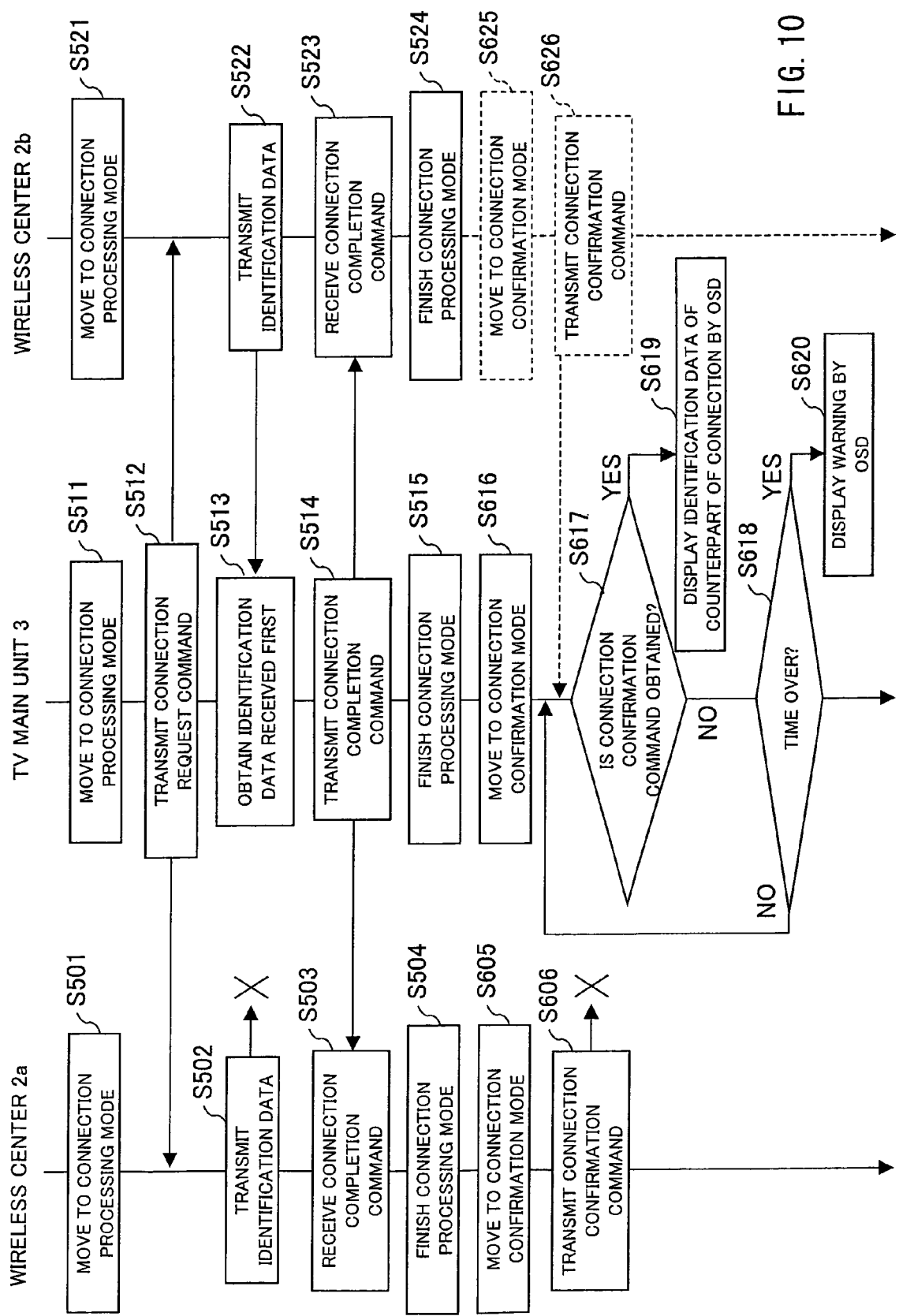
FIG. 10 is a flow chart of a case where a connection, which is unintended by a user, between the wireless center and the TV main unit is established, the flow chart illustrating a fifth pattern of a connection processing between the wireless center and the TV main unit.

FIG. 10 also describes a case in which the wireless center 2b and the TV main unit 3 are wirelessly connected first although the user tries to establish the wireless connection between the wireless center 2a and the TV main unit 3. In FIG. 10, steps identical to the steps as illustrated in FIG. 9 is appended by the same step reference numbers as in FIG. 9 and the explanation of the steps is omitted.

In FIG. 10, when the TV main unit 3 and the wireless centers 2a and 2b finishes the connection processing mode (S504, S505, S524), the wireless center 2b and the TV main body 3 are wireless connected to each other, and the TV main unit 3 decrypts the data stream transmitted from the wireless center 2b and reproduces the video image and sound based on this data stream. On the other hand, the wireless center 2a is carrying out an operation for transmitting data stream, even though the wireless center 2b and the TV main body 3 are not wirelessly connected to each other.

Here the user checks whether or not the TV main unit 3 and the wireless center 2a are wirelessly connected. To be more specific, a user's push on a connection confirmation button (not illustrated) provided to the TV main unit 3 and the wireless center 2a, the TV main unit 3 and the wireless center 2a transit to the connection confirmation mode (S605, S616).

The wireless center 2a that have moved to the connection confirmation mode transmits a connection confirmation command including the identification data of the wireless center 2a by broadcasting at predetermined intervals (S606). However, because the TV main unit 3 is wirelessly connected to the wireless center 2b, the TV main unit 3 cannot obtain the connection confirmation command from the wireless center 2a (NO at S617). The TV main unit 3 after an establishment of a wireless connection to the wireless center 2b decrypts a command and data received only by the identification key included in the identification data of the wireless center 2b, although the command and data transmitted form the wireless center 2a which is confirming the establishment of the wireless connection is encrypted by the identification key of the wireless center 2a.

Then, in case where a predetermined time has elapsed without obtaining the connection confirmation command (YES at S618), the TV main unit 3 performs an OSD warning display on the display section 63 (S620). The user can recognize, by this warning display, that the wireless center 2a and the TV main unit 3 are not wirelessly connected with each other, and can retry the connection processing right away.

Next explained is a case where the user tentatively checks whether or not the TV main unit 3 and the wireless center 2b are wirelessly connected or not. In this case, the user's push on the connection confirmation button (not illustrated) provided to the TV main unit 3 and the wireless center 2b causes the TV main unit 3 and the wireless center 2b to move to the connection confirmation mode (S616 and S625).

The wireless center 2b that has gone to the connection confirmation mode transmits a connection confirmation command including the identification data of the wireless center 2b by broadcasting at predetermined intervals (S626). In response to the transmission, because the TV main unit 3 is wirelessly connected to the wireless center 2b, the TV main unit 3 can obtain the connection confirmation command from the wireless center 2b (YES at S617). The TV main unit 3 after the establishment of the wireless connection to the wireless center 2b decrypts the command and data received by the identification key included in the identification data of the wireless center 2b because the command and the data transmitted from the wireless center 2b that recognizes the establishment of the wireless connection is encrypted by the identification key of the wireless center 2b.

Then, when the TV main unit 3 obtains the connection confirmation command, the TV main unit 3 displays the identification data of a counterpart of the connection by OSD on the display section 63 (S619). The user can check that the counterpart of the connection is the wireless center 2b by this display.

As mentioned above, according to the embodiment as illustrated in FIG. 10, the wireless center 2 that has gone to the connection confirmation mode is arranged to transmit the connection confirmation command when the TV main unit 3 and the wireless center 2 are moved to the connection confirmation mode by the user's instruction. Here, in a case where the TV main unit 3 is connected to the wireless center 2 which has gone to the connection mode, the TV main unit 3 can obtain the connection confirmation command mentioned above. However, in a case where the TV main unit 3 is not connected to the wireless center 2 that has moved to the connection mode, the TV main unit 3 cannot obtain the connection confirmation command.

Accordingly, as illustrated in FIG. 10, in a case where the TV main unit 3, after transition to the connection confirmation command, does not obtain the connection confirmation command from the wireless center 2a which has moved to the connection confirmation mode within a predetermined time, the TV main unit 3 is arranged to warn the user. Then, the user receiving the warning can check that the wireless center 2 and the TV main unit 3 are not wirelessly connected.

Accordingly, the user can know easily whether an intended wireless center 2 and the TV main unit 3 are connected with each other if the user causes the intended wireless center 2 and the TV main unit 3 to move to the connection confirmation mode.

As mentioned above, the embodiment as illustrated in FIG. 9 is arranged to notify the user the wireless center 2 to which a connection is established by displaying the identification data on the display section 63 by OSD display. However, the display is not limited to the display by OSD. For example, only the identification data may be displayed on the display section 63, or, the user may be notified the wireless center to which the connection is established presently by sound.

Moreover, according to the embodiment as illustrated in FIG. 10, the warning to the user is carried out by a warning display on the display section 63 by OSD at S620. However, the warning display is not limited to the display by OSD. Namely, the warning may be carried out by means such as displaying an identification code indicating warning as an image, giving the warning by sound, or turning on a warning lump.

Furthermore, according to the configurations illustrated in FIGS. 9 and 10, an identification key for decoding encrypted data, command and the like as well as encoding the data and command. However, the identification key may not be included. For example, the identification data and the identification key may be transmitted/received separately.

Moreover, the identification key mentioned above may be arranged so as to be capable of encoding and decoding of data by a single identification key. The identification key may include encoding key and decoding key which are constituted separately.

Moreover, so long as the TV main unit 3 is arranged to obtain the identification data of the wireless center 2 and connect to the wireless center 2 indicated by the obtained identification data in FIGS. 9 and 10, the embodiment of the connection processing mode (S501 through 504, S511 through 515, S521 through 524) of the TV main unit 3 and the wireless center 2 are changeable and the embodiment is not limited to the configurations illustrated in FIGS. 9 and 10.

So far, the method for establishing the communication pair in the wireless AV system of the present embodiment is explained, referring to the specific configurations. The present invention, however, is not limited to the present embodiment and the specific configurations. For a person skilled in the art, it is possible to variously modify and/or improve, within the scope of the gist of the present invention the arrangement and function of the present invention according to the embodiment, and other embodiments.

For example, even though the portable AV apparatus is the TV receiver in the embodiment, the present invention is not limited the portable AV apparatus and is applicable to any device which has a wireless communication function or is integrated with the wireless communication function. For example, the AV apparatus may be a recording/reproducing device for recording HDD or DVD, besides VTR (Video Tape Recorder). Moreover, as the device capable of transmitting/receiving the data, a device integrated with information apparatus function, such as a personal computer may be used. Such device is applicable to all the system. Moreover, the data to be transmitted/received may have any content.

Furthermore, the TV main unit 3 is the TV receiver in the present embodiment. But, the present invention is not limited to this. As described above, the present invention is also applicable to a configuration having a turner and a personal computer, and to other AV apparatuses using a tuner.

Moreover, the present invention is not limited in terms of the types of each processing section constituting the wireless communication device and wireless AV system, types and formats of setting information, and the like, which are discussed in the present embodiment. The present invention is suitably applicable to an apparatus in conformity with HAVi.

Moreover, the tuner is exemplified here by the two kinds of tuners, namely, the BS tuner and U/V tuner. The present invention is not limited in terms of types of broadcasting (such as CS tuner) and the number of tuners.

It should be noted the terms "wireless communication device and wireless AV system" is used in the present invention for the sake of easy explanation, and the terms may be a wireless communication apparatus, AV apparatus, broadcasting station selecting station device, and the like.

The wireless communication device, wireless AV system, TV main unit 3, and wireless center 2 can be realized with program(s) that operates the wireless communication device, wireless AV system, TV main unit 3, and wireless center 2. The program(s) is stored in a computer-readable storage medium (media). In the present invention, a main memory itself may be a program medium functioning as the storage medium/media. In an alternative, a program reading device is provided as an external recording device, and the storage medium (media) is a computer readable program medium that is inserted in and read by the external recording device.

In addition, in either of the cases, the contained program may be accessible to a microprocessor which will execute the program. Further, it is preferable if the program is read, and the program is then downloaded to a program storage area of a microcomputer where the program is executed. Assume that the program for download is stored in a main body device in advance.

In the above arrangement, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Furthermore, even though it is not illustrated, if a system is provided with means enabling connection with an external communication network, the program medium may be a storage medium carrying the program in a flowing manner so that the program is downloaded over the communications network via the means.

Further, when the program is downloaded over a communications network in this manner, it is preferable if the program for download is stored in a main body device in advance or installed from another storage medium. The content stored in the recording medium is not limited to a program and may be data.

A wireless AV system of the present invention may be a wireless system comprising one or more transmission-side devices and one or more reception-side devices, each of the one or more transmission-side devices comprises means for issuing its own ID with respect to the one or more reception-side devices, the one or more reception-side devices comprising means for storing the ID received from a transmission-side device.

Moreover, in the wireless AV system as described above, each of the one or more reception-side devices may comprise means for transmitting connection confirmation command to a transmitting-side device if the reception-side device receives the ID from the transmitting-side device.

Further, in the wireless AV system as described above, each of the one or more reception-side devices may further comprise means for displaying the ID from the transmitting-side device.

Moreover, in the wireless AV system as described above, each of the one or more transmission-side devices may comprise means for issuing its own ID with respect to the one or more reception-side devices, and transmitting own device type, and each of the one or more reception-side devices may comprise means for displaying the device type received from a transmission-side device.

Further, in the wireless AV system as described above, each of the one or more transmission-side devices may comprise means for issuing its-own ID with respect to the one or more reception-side devices, and transmitting own device name that a user predetermined, and each of the one or more reception-side devices may comprise means for displaying the name received form a transmission-side device.

Moreover, in the wireless AV system as described above, each of the one or more transmission-side devices may comprise means for transmitting, after the issue of own ID with respect to the reception-side device, a pair confirmation signal to the reception-side device at constant time intervals, and each of the one or more reception-side devices may comprise means for comparing (a) the ID contained in the pair confirmation signal transmitted thereto from the reception-side device, with (b) ID stored therein.

Furthermore, in the wireless AV system as described above, each of the one or more reception-side devices may be arranged such that if (a) the ID contained in the pair confirmation signal transmitted thereto from the reception-side device does not match with (b) the ID stored therein, the reception-side device may display that they are unmatched with one another.

Furthermore, in the wireless AV system as described above, each of the one or more transmission-side devices may comprise notification means which, if the transmission-side device does not receive the connection confirmation command within a predetermined time period after the issue of own ID with respect to the reception-side device, notifies that the transmission-side device has not received the connection confirmation command.

Furthermore, in the wireless AV system as described above, the notification means of the one or more transmission-side devices may be an LED light emitting device that performs a predetermined light emitting operation.

As described above, the present invention provides a wireless AV system in which it is possible to notify a user that an unintended wrong communication pair is established between AV devices, if such an unintended wrong communication is established.

In order to attain the object mentioned above, according to the present invention, a wireless terminal for establishing connection with a base device, includes: connection establishing means for establishing the connection with the base device by obtaining identification data that specifies the base device; and connection counterpart notifying means for notifying, based on the identification data, a user of the base device to which the wireless terminal is currently connected.

According to the above arrangement, the wireless terminal obtains the identification data from the base device and establishes the connection with the base device. Moreover, the wireless terminal notifies, based on the identification data, a user of the base device to which the wireless terminal is currently connected. Accordingly, the user can specify the base device that is a connection counterpart and the user can know whether the wireless terminal is connected with the base device that the user requests for.

In addition to the above arrangement, a wireless terminal of the present invention includes: connection requesting means for transmitting a connection request command that requests for connection with a base device, the connection establishing means for obtaining identification data that reaches the connection establishing means earlier than rest of pieces of identification data that the connection establishing means receives from base devices that respond to the connection request command, and then establishing connection with the base device that is indicated by the thus obtained identification data.

In the above arrangement, the wireless terminal transmits the connection request command to the base device. There is a case where a plurality of the base devices respond to the connection request command from the wireless terminal and transmit own identification data to the wireless terminal. In this case, the wireless terminal obtains identification data that reaches the connection establishing means earlier than rest of pieces of identification data that the connection establishing means receives from base devices that respond to the connection request command, and then establishes connection with the base device that is indicated by the thus obtained identification data. Because of this, the wireless terminal is sometimes connected with a base device other than the base device that the user requests for.

In this arrangement, the wireless terminal notifies, based on the identification data, the user of the base device to which the wireless terminal is currently connected. Therefore, even if a plurality of the base devices respond to the connection request from the wireless terminal, the user can know whether the wireless terminal is connected with the base device that the user requests for.

A wireless terminal of the present invention, in addition to the arrangement mentioned above, includes: connection notifying means for transmitting, after the obtaining of the identification data, a connection process completion command that indicates that the connection with the base device is established.

According the above arrangement, there is a case where a plurality of base devices respond to the connection request command and obtain the connection process completion command. Even in such a case, only the base device that transmitted the identification data to the wireless terminal earlier than the rest of the base devices is connected to the wireless terminal. Therefore, the rest of the base devices are not connected thereto. However, the rest of the base devices recognize that they are connected to the wireless terminal and perform the operation that follows the establishment of the connection.

According to the arrangement, even if the base devices recognize that they are connected to the wireless terminal and perform the operation that follows the establishment of the connection, the connection counterpart notifying means identifies, to the user, which base device is connected. This allows the user to recognize whether or not the wireless terminal is connected with the base device that the user requests for.

In a wireless terminal of the present invention, in addition to the above arrangement, the identification data contains a key for encrypting the data and a key for decrypting the encrypted data.

According to the arrangement, the identification data contains a key for encoding the data and a key for decoding the encrypted data. Accordingly, the wireless terminal having obtained the identification data from the base device can decode this data even if this base device transmits the data encrypted based on the above identification data. Therefore, the wireless terminal having obtained this identification data from the base device can establish a connection with the base device indicated by this identification data.

The key for encoding the data and the key for decoding the encrypted data mentioned above may be an identical key. Namely, encoding and decoding of data may be carried out by the same key. Moreover, a key for encoding data and a key for decoding data may be arranged separately.

In a wireless terminal of the present invention, in addition to the above arrangement, the key for encoding the data and the key for decrypting the encrypted data are algorisms specific to the base device indicated by the identification data.

According to the above arrangement, the key for encoding the data and the key for decrypting the encrypted data are algorisms specific to the base device indicated by the identification data. Accordingly, the wireless terminal having obtained this identification data can establish a unique connection state with the base device indicated by this identification data.

A wireless terminal of the present invention, in addition to the above arrangement, includes: image output means for causing display means to display an image based on image dada received from the base device to which the wireless terminal is connected, the connection counterpart notifying means displaying the identification data on the display section in an ODS manner.

According to the above arrangement, the wireless terminal displays an image based on image data received from the base device to which the wireless terminal is connected. The wireless terminal also displays the identification data on the display section in an ODS manner. Accordingly, the user can confirm a base device to which the wireless terminal is connected while the user is viewing an image displayed on the display means.

In order to achiever the object mentioned above, a base device of the present invention includes: identification data transmission means for transmitting the identification data to the wireless terminal.

This allows the user to be notified of a base device, to which the wireless terminal is connected, from the wireless terminal. Accordingly, the user can know whether the wireless terminal is connected with the base device that the user requests for.

In order to achieve the above object, a wireless system of the present invention includes: the wireless terminal; and a base device including identification data transmission means for transmitting the identification data to the wireless terminal.

This allows the user to be notified of a base device, to which the wireless terminal is connected, from the wireless terminal. Accordingly, the user can know whether the wireless terminal is connected with the base device that the user requests for.

In order to achieve the above object, according to the present invention, in a wireless system including a base device and a wireless terminal, the wireless terminal includes: connection establishing means for establishing the connection with the base device by obtaining identification data that specifies the base device; first connection confirming mode transiting means for causing transition into a connection confirmation mode in accordance with input of an instruction from a user; connection confirming means for obtaining, after the transition to the connection confirmation mode, a connection confirmation command from the base device to which the wireless terminal is connected, the connection confirmation command being for confirming the connection; and warning means for warning the user if the connection confirmation means does not obtain the connection confirmation command within a predetermined time after the transition to the connection confirmation mode, and the base device includes: identification data transmission means for transmitting the identification data that identifies the base device; second connection confirming mode transiting means for causing transition into the connection confirmation mode in accordance with the input of the instruction from the user; and connection confirmation command transmitting means for transmitting the connection confirmation command, if the transition into the connection confirmation is performed.

According to the above arrangement, by obtaining the identification data transmitted from the base device, the wireless terminal can establish the connection with this base device. However, in a case where the wireless terminal has not obtained this identification data for some reason, the connection between the wireless terminal and the base device is not established.

According to the above arrangement, when the wireless device and the base device is moved into a connection confirmation mode in accordance with input of an instruction from a user, the base device that has moved to the connection confirmation mode is arranged to transmit the above connection confirmation command. In case where the wireless terminal is connected to this base device that has moved into the connection confirmation mode, the wireless terminal can obtain the above connection confirmation command. However, in case where the wireless terminal is not connected to this base device that has moved into the connection confirmation mode, the wireless terminal cannot obtain the above connection confirmation command.

Accordingly, in an arrangement in which warning is given to a user in a case where the wireless terminal, after the transition to the connection confirmation mode, does not obtain the above connection confirmation command from the base device that has moved into the connection confirmation mode within a predetermined time, the user who has received the warning can confirm that the base device that has moved into the connection confirmation mode is not connected to the wireless terminal.

If the user causes the base device that the user requests for and the wireless terminal to move into a connection confirmation mode, the user can easily know whether the wireless terminal is connected with the base device that the user requests for.

In a wireless system of the present invention, in addition to the above arrangement, the wireless terminal includes connection requesting means for transmitting a connection request command that requests for connection with a base device, the base device includes identification data transmission means for transmitting the identification data to the wireless terminal if the base device receives the connection request signal, and the connection establishing means obtains identification data that reaches the connection establishing means earlier than rest of pieces of identification data that the connection establishing means receives from base devices that respond to the connection request command, and then establishes connection with the base device that is indicated by the thus obtained identification data.

According to the above arrangement, the wireless terminal transmits the above connection request command. If the base device receives this connection request command, the base device transmits the above identification data. Here, plural base devices may respond to the connection request command transmitted from the wireless terminal and may respectively transmit their own identification data. In such a case, the wireless terminal is arranged to obtain only the identification data that reaches the wireless terminal earlier than rest of pieces of identification data that the wireless terminal receives from base devices that respond to the connection request command, and to establish the connection with the base device that is indicated by the thus obtained identification data. Because of this, the wireless terminal is sometimes connected with a base device other than the base device that the user requests for.

According to the above arrangement, even in a case where plural base devices respond to the connection request command from the wireless terminal, the user can easily know whether the wireless terminal is connected with the base device that the user requests for by causing the base device that the user requests for and the wireless terminal to move into the connection confirmation mode.

In addition to the above arrangement, in a wireless system of the present invention, the wireless terminal includes connection notifying means for transmitting, after the obtaining of the identification data, a connection process completion command that indicates that the connection with the base device is established, and the base device includes connection acknowledging means for acknowledging the connection with the wireless terminal if the base device receives the connection completion command.

According the above arrangement, there is a case where a plurality of base devices respond to the connection request command and obtain the connection process completion command. Even in such a case, only the base device that transmitted the identification data to the wireless terminal earlier than the rest of the base devices is connected to the wireless terminal. Therefore, the rest of the base devices are not connected thereto. However, the rest of the base devices recognize that they are connected to the wireless terminal and perform the operation that follows the establishment of the connection.

According to the arrangement, even if the base devices recognize that they are connected to the wireless terminal and perform the operation that follows the establishment of the connection, the user can easily know whether the wireless terminal is connected with the base device that the user requests for by causing the base device that the user requests for and the wireless terminal to move into the connection confirmation mode.

In a wireless system of the present invention, in addition to the arrangement mentioned above, the identification data contains a key for encoding the data and a key for decrypting the encrypted data.

According to the arrangement, the identification data contains a key for encoding the data and a key for decoding the encrypted data. Accordingly, the wireless terminal having obtained the identification data from the base device can decode this data even if this base device transmits the data encrypted based on the above identification data. Therefore, the wireless terminal having obtained this identification data from the base device can establish a connection with the base device indicated by this identification data.

In a wireless system of the present invention, in addition to the above arrangement, the key for encoding the data and the key for decoding the encrypted data are algorisms specific to the base device indicated by the identification data.

According to the above arrangement, the key for encoding the data and the key for decrypting the encrypted data are algorisms specific to the base device indicated by the identification data. Accordingly, the wireless terminal having obtained this identification data can establish a unique connection state with the base device indicated by this identification data.

A wireless system of the present invention, in addition to the above arrangement, includes: image output means for causing display means to display an image based on image dada received from the base device to which the wireless terminal is connected, the connection counterpart notifying means displaying the identification data on the display section in an OSD manner.

According to the above arrangement, the wireless terminal displays an image based on image data received from the base device to which the wireless terminal is connected. The wireless terminal also displays warning on the display section in an ODS manner. Accordingly, the user can easily know whether the wireless terminal is connected with the base device that the user requests for while the user is viewing an image displayed on the display means.

A wireless system of the present invention constitutes the wireless system and can attain the same effect as the wireless system as mentioned above. Further, a base device constitutes the wireless system and can attain the same effect as the wireless system as mentioned above.

The wireless terminal or the base device may be realized by a computer. In such a case, a computer readable storage medium which stores a control program for realizing the wireless terminal or the base device with a computer by causing the computer to function as each of the means mentioned above, is also included in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The wireless system of the present invention preferable to an domestic AV net work system that wirelessly transmits video and/or audio data wirelessly, for example, a wireless TV receiver separable from a display. However, the present invention is not limited to this. The wireless system of the present invention is applicable to wide variety of wireless communication devices such as a cellular phone/PHS (Personal Handyphone System)®, a portable information terminal (PDA (Personal Digital Assistants)) and the like.

The invention claimed is:

1. A wireless terminal, when connected to a base device, receiving video data or both video data and audio data from the connected base device, comprising:
   connection requesting means for, when there are a plurality of base devices in a communications range of the wireless terminal, broadcasting to the plurality of base devices, a connection request command that requests a connection with a base device;
   connection establishing means for, receiving only an earliest incoming one set of identification data from among sets of identification data, being transmitted from the plurality of base devices in response to the connection request command, each set of identification data indicating one base device, so as to establish a connection with a base device that is indicated by the thus received, earliest incoming set of identification data;
   connection completion notifying means for, after the receiving of the earliest incoming set of identification data, broadcasting to the plurality of base devices, a connection process completion command that indicates that the connection with the connected base device is established;
   connection counterpart notifying means for notifying, based on the earliest incoming set of identification data, a user of identification data of the base device to which the wireless terminal is currently connected; and
   image output means for causing a display section to display an image based on video data received from the base device to which the wireless terminal is connected,
   the connection counterpart notifying means displaying the identification data of the connected base device on the display section in an OSD manner.

2. A wireless terminal as set forth in claim 1, wherein:
   the identification data contains a key for encrypting the data and a key for decrypting the encrypted data.

3. A wireless terminal as set forth in claim 2, wherein:
   the key for encrypting the data and the key for decrypting the encrypted data are algorithms specific to the base device indicated by the identification data.

4. A base device comprising:
   identification data transmission means for transmitting the identification data to the wireless terminal as set forth in claim 1.

5. A wireless system comprising:
   the wireless terminal as set forth in claim 1; and
   a base device comprising identification data transmission means for transmitting the identification data to the wireless terminal as set forth in claim 1.

6. A non-transitory computer readable storage medium storing a control program for operating a wireless terminal as set forth in claim 1, the control program causing a computer to function as each of the means.

7. A wireless system comprising a base device and a wireless terminal which, when connected to a base device, receives either video data or both video data and audio data from the connected base device, wherein:
   the wireless terminal comprises:
      connection requesting means for, when there are a plurality of base devices in a communications range of the wireless terminal, broadcasting to the plurality of base devices, a connection request command that requests a connection with a base device;
      connection establishing means for, receiving only an earliest incoming one set of identification data from among sets of identification data, being transmitted from the plurality of base devices in response to the connection request command, each set of identification data indicating one base device, so as to establish a connection with a base device that is indicated by the thus received, earliest incoming set of identification data;
      connection completion notifying means for, after the receiving of the earliest incoming set of identification data, broadcasting to the plurality of base devices, a connection process completion command that indicates that the connection with the connected base device is established;
      first connection confirming mode transiting means for causing transition into a connection confirmation mode in accordance with input of an instruction from a user;
      connection confirming means for obtaining, after the transition to the connection confirmation mode, a connection confirmation command from the base device to which the wireless terminal is connected, the connection confirmation command being for confirming the connection;
      warning means for warning the user if the connection confirmation means does not obtain the connection confirmation command within a predetermined time after the transition to the connection confirmation mode;
      connection counterpart notifying means for notifying, based on the earliest incoming set of identification data, a user of identification data of the base device being currently connected if the connection confirmation command is received within a predetermined time; and
      image output means for causing a display section to display an image based on video data received from the base device to which the wireless terminal is connected,
      the connection counterpart notifying means displaying the identification data of the connected base device on the display section in an OSD manner, and
      the warning means warning the user by displaying a warning message on the display section in an OSD manner and
   the base device comprises:
      identification data transmission means for transmitting the identification data after receiving a connection request command;
      means for, after receiving the connection process completion command, recognizing that the connection is established and transmitting either video data or both video data and audio data to the wireless terminal;
      second connection confirming mode transiting means for causing transition into the connection confirmation mode in accordance with the input of the instruction from the user; and
      connection confirmation command transmitting means for transmitting the connection confirmation command, if the transition into the connection confirmation mode is performed.

8. The wireless system as set forth in claim 7, wherein:
   the identification data contains a key for encrypting the data and a key for decrypting the encrypted data.

9. A wireless system as set forth in claim 8, wherein:
the key for encrypting the data and the key for decrypting the encrypted data are algorithms specific to the base device indicated by the identification data.

10. A non-transitory computer readable storage medium storing a control program for operating a wireless terminal constituting the wireless system as set forth in claim 7, the control program causing a computer to function as each of the means.

11. A non-transitory computer readable storage medium storing a control program for operating a base device constituting the wireless system as set forth in claim 7, the control program causing a computer to function as each of the means.

* * * * *